(12) United States Patent
Hosoda

(10) Patent No.: US 12,401,741 B2
(45) Date of Patent: *Aug. 26, 2025

(54) SERVER, CLIENT TERMINAL, CONTROL METHOD, AND STORAGE MEDIUM

(71) Applicant: SONY GROUP CORPORATION, Tokyo (JP)

(72) Inventor: Yasuhide Hosoda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,692

(22) Filed: Sep. 28, 2023

(65) Prior Publication Data
US 2024/0022660 A1     Jan. 18, 2024

Related U.S. Application Data

(63) Continuation of application No. 17/592,977, filed on Feb. 4, 2022, now Pat. No. 11,825,012, which is a (Continued)

(30) Foreign Application Priority Data

Oct. 7, 2016   (JP) ................................ 2016-199028

(51) Int. Cl.
*H04M 1/00*    (2006.01)
*G06F 3/01*    (2006.01)
(Continued)

(52) U.S. Cl.
CPC ........ *H04M 1/72439* (2021.01); *G06F 3/013* (2013.01); *G06V 40/20* (2022.01);
(Continued)

(58) Field of Classification Search
CPC ......... H04M 1/72439; H04M 1/72433; H04W 4/029; G06V 40/20; G06V 40/50; G06F 3/013
See application file for complete search history.

(56) References Cited

U.S. PATENT DOCUMENTS 11,283,915 B2 *   3/2022   Hosoda .................. G06V 40/20
11,825,012 B2 *  11/2023   Hosoda ............. H04M 1/72439
(Continued)

FOREIGN PATENT DOCUMENTS

CN          103793360 A       5/2014
CN          104067633 A       9/2014
(Continued)

OTHER PUBLICATIONS

International Search Report and Written Opinion of PCT Application No. PCT/JP2017/024628, issued on Sep. 12, 2017, 09 pages of English Translation and 07 pages of ISRWO.
(Continued)

*Primary Examiner* — Khai M Nguyen
(74) *Attorney, Agent, or Firm* — CHIP LAW GROUP

(57) ABSTRACT

To propose a server, a client terminal, a control method, and a storage medium that are capable of presenting information that a user does not notice. The server includes a communication unit that receives information related to an image acquired by an imaging unit of a client terminal, and a control unit that is capable of extracting information corresponding to an object on the basis of the information related to the image, and transmit information related to the object to the client terminal, the object being positioned outside of a gaze area of a user and being related to user information.

20 Claims, 29 Drawing Sheets

Related U.S. Application Data continuation of application No. 16/328,816, filed as application No. PCT/JP2017/024628 on Jul. 5, 2017, now Pat. No. 11,283,915.

(51) Int. Cl.
*G06V 40/20* (2022.01)
*G06V 40/50* (2022.01)
*H04M 1/72433* (2021.01)
*H04M 1/72439* (2021.01)
*H04W 4/029* (2018.01)

(52) U.S. Cl.
CPC ........ *G06V 40/50* (2022.01); *H04M 1/72433* (2021.01); *H04W 4/029* (2018.02)

(56) References Cited

U.S. PATENT DOCUMENTS

| | | | |
|---|---|---|---|
| 2006/0179451 A1* | 8/2006 | Sung | H04N 21/44218 725/12 |
| 2012/0287218 A1* | 11/2012 | Ok | H04N 7/15 348/14.02 |
| 2013/0262565 A1 | 10/2013 | Nakamura et al. | |
| 2014/0081634 A1 | 3/2014 | Forutanpour et al. | |
| 2014/0123015 A1* | 5/2014 | Sako | G06F 16/9537 715/720 |
| 2014/0300636 A1* | 10/2014 | Miyazaya | H04R 5/033 345/633 |
| 2015/0381885 A1 | 12/2015 | Kim et al. | |
| 2016/0063893 A1 | 3/2016 | Kanuganti et al. | |
| 2016/0150124 A1* | 5/2016 | Panda | G06F 3/1238 358/1.14 |
| 2016/0282618 A1 | 9/2016 | Kon et al. | |
| 2017/0147276 A1 | 5/2017 | Kajiwara et al. | |
| 2018/0150133 A1 | 5/2018 | Cho et al. | |
| 2019/0046080 A1* | 2/2019 | Nishikado | G06V 20/41 |
| 2020/0273550 A1* | 8/2020 | Matos | G16Z 99/00 |

FOREIGN PATENT DOCUMENTS

| | | | |
|---|---|---|---|
| CN | 104641413 A | | 5/2015 |
| CN | 105474302 A | | 4/2016 |
| EP | 2810454 A1 | | 12/2014 |
| EP | 2898505 A1 | | 7/2015 |
| EP | 3030954 A1 | | 6/2016 |
| JP | 2005-037181 A | | 2/2005 |
| JP | 2007-514332 A | | 5/2007 |
| JP | 2011233133 A | * | 11/2011 |
| JP | 2013-009073 A | | 1/2013 |
| JP | 2013-162285 A | | 8/2013 |
| JP | 2014-003403 A | | 1/2014 |
| JP | 2014-036739 A | | 2/2014 |
| JP | 2014-090386 A | | 5/2014 |
| JP | 2014-167716 A | | 9/2014 |
| JP | 2015-118332 A | | 6/2015 |
| JP | 2016-130985 A | | 7/2016 |
| KR | 10-2014-0128306 A | | 11/2014 |
| KR | 10-2014-0136582 A | | 12/2014 |
| KR | 10-2015-0058286 A | | 5/2015 |
| KR | 10-2016-0015704 A | | 2/2016 |
| WO | 2013/114831 A1 | | 8/2013 |
| WO | 2014/046833 A1 | | 3/2014 |
| WO | 2015/092968 A1 | | 9/2015 |
| WO | 2018/143341 A1 | | 8/2018 |

OTHER PUBLICATIONS

Office Action for JP Patent Application No. 2018-543739, issued on Apr. 27, 2021, 04 pages of English Translation and 04 pages of Office Action.

International Preliminary Report on Patentability of PCT Application No. PCT/JP2017/024628, issued on Apr. 18, 2019, 09 pages of English Translation and 04 pages of IPRP.

Non-Final Office Action for U.S. Appl. No. 16/328,816, issued on Jul. 15, 2021, 09 pages.

Notice of Allowance for U.S. Appl. No. 16/328,816, issued on Nov. 10, 2021, 10 pages.

Notice of Allowance for U.S. Appl. No. 17/592,977, issued on Jul. 19, 2023, 10 pages.

Final Office Action for U.S. Appl. No. 17/592,977, issued on May 1, 2023, 09 pages.

Non-Final Office Action for U.S. Appl. No. 17/592,977, issued on Jan. 13, 2023, 13 pages.

* cited by examiner

FIG. 5

USER INFORMATION DB

| USER ID | SEX | AGE | PREFERENCE INFORMATION 1 | PREFERENCE INFORMATION 2 |
|---|---|---|---|---|
| USER_001 | FEMALE | 35 | FEMININE CLOTHES | · SKIRT<br>· BLOUSE |
| ... | ... | ... | ... | ... |

FIG. 6

OBJECT INFORMATION DB

| OBJECT ID | TAG ID | ATTRIBUTE INFORMATION | PROVISION INFORMATION (SIMPLE INFORMATION) | PROVISION INFORMATION (DETAILED INFORMATION) | CHARACTER IMAGE | CHARACTERISTIC |
|---|---|---|---|---|---|---|
| Obj_001 | Tag_001 | · FEMININE CLOTHES<br>· SKIRT | NEW SKIRTS HAVE ARRIVED! | NEW SUMMER FLARED SKIRTS HAVE ARRIVED! | Eye image_001 | THIS IS EASY TO MATCH A MONOCHROME BAG. |
| ... | ... | ... | ... | ... | ... | ... |

FIG. 19
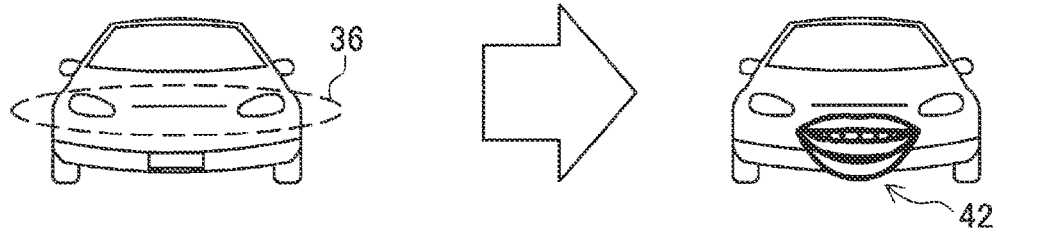
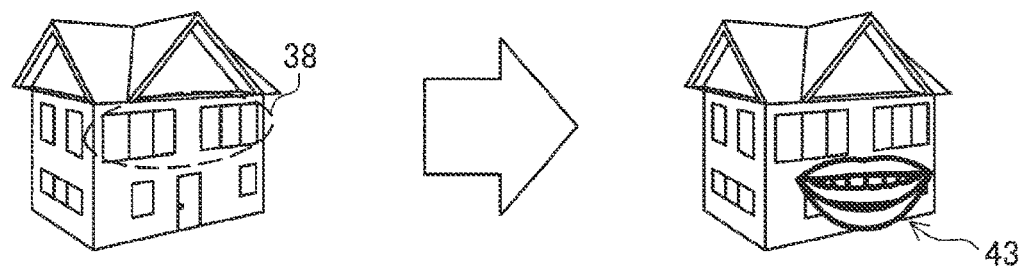
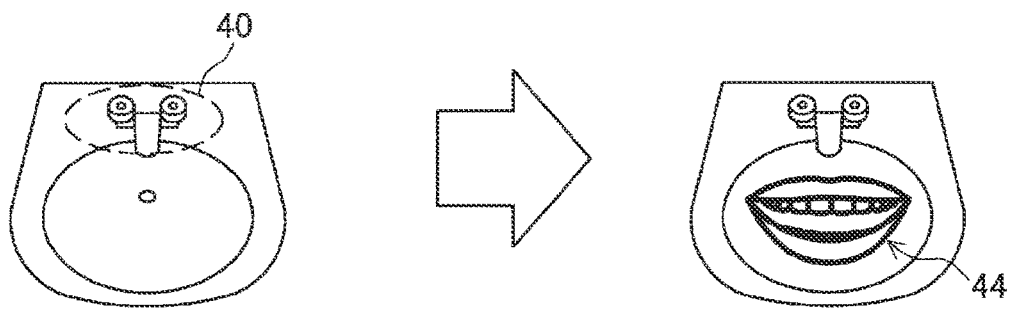
FIG. 20
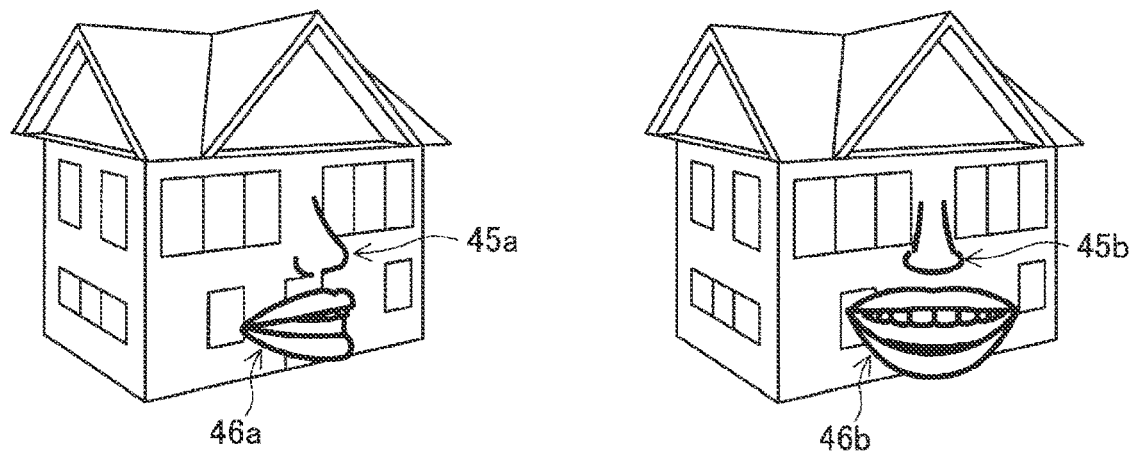

FIG. 23
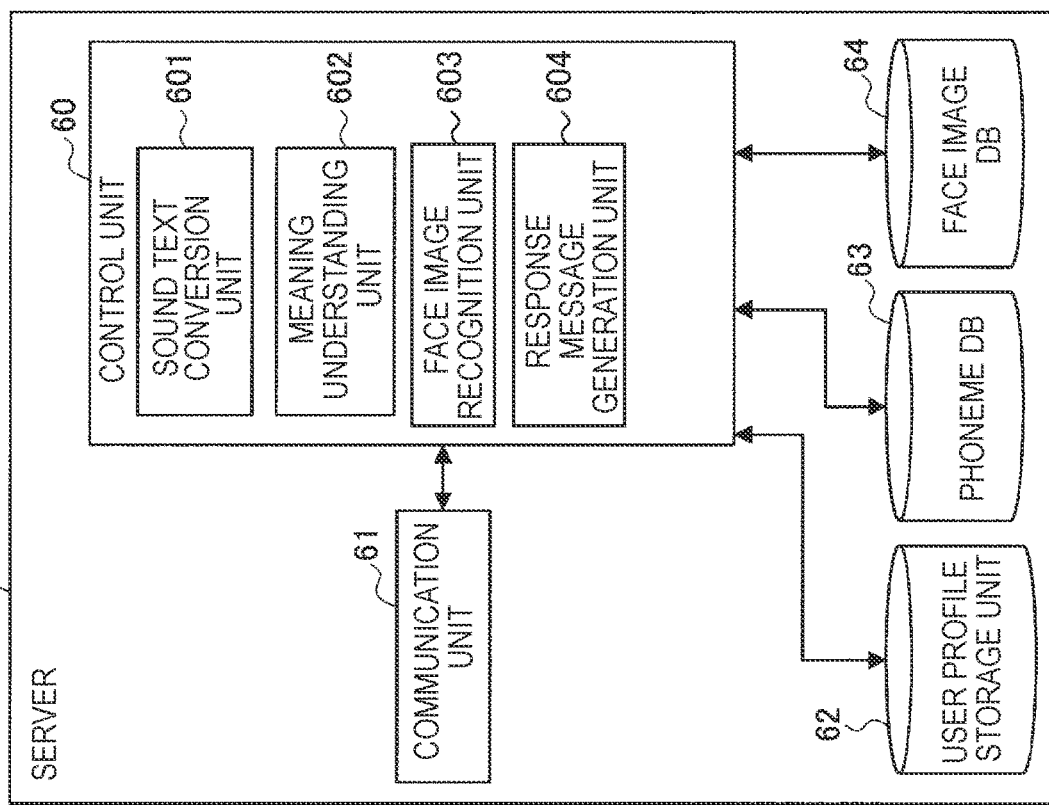
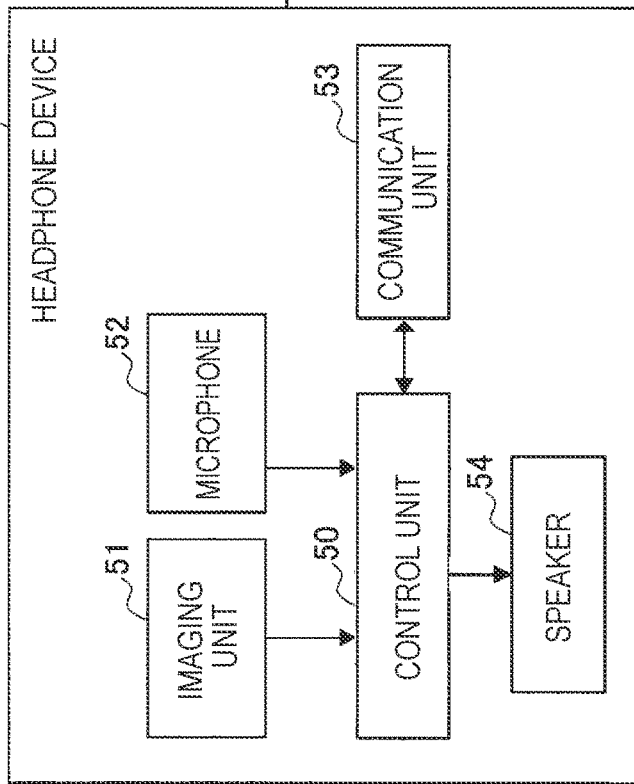

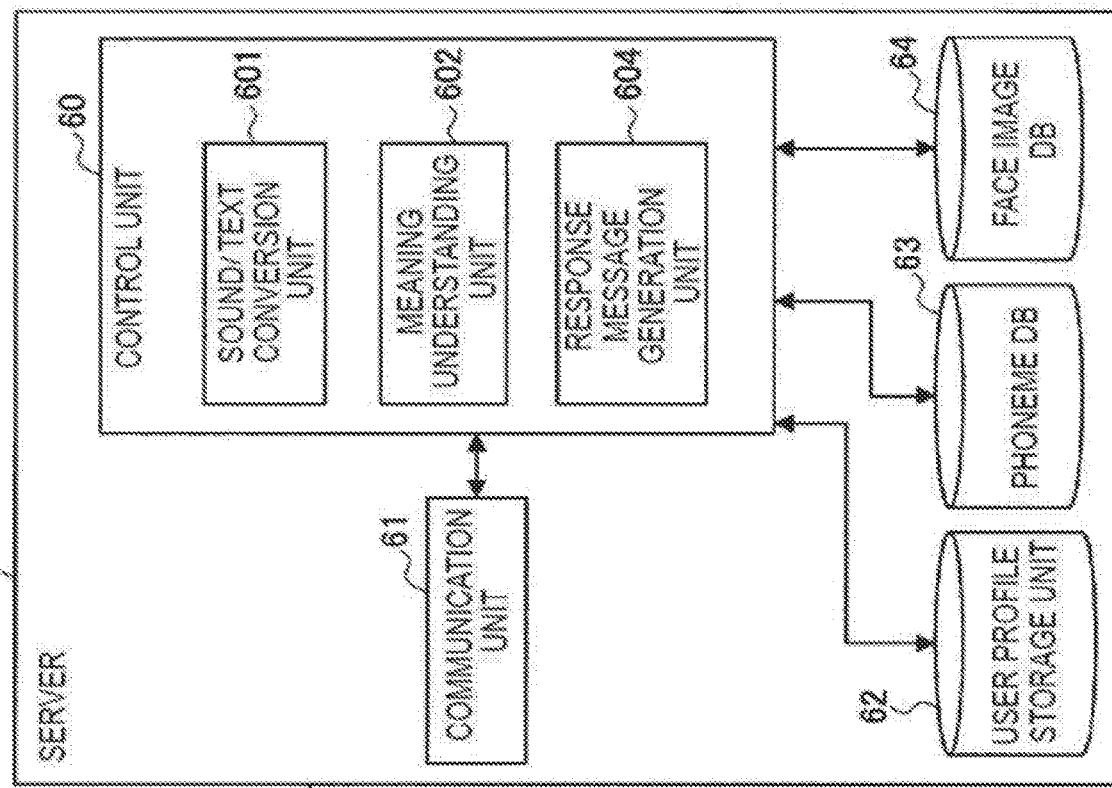
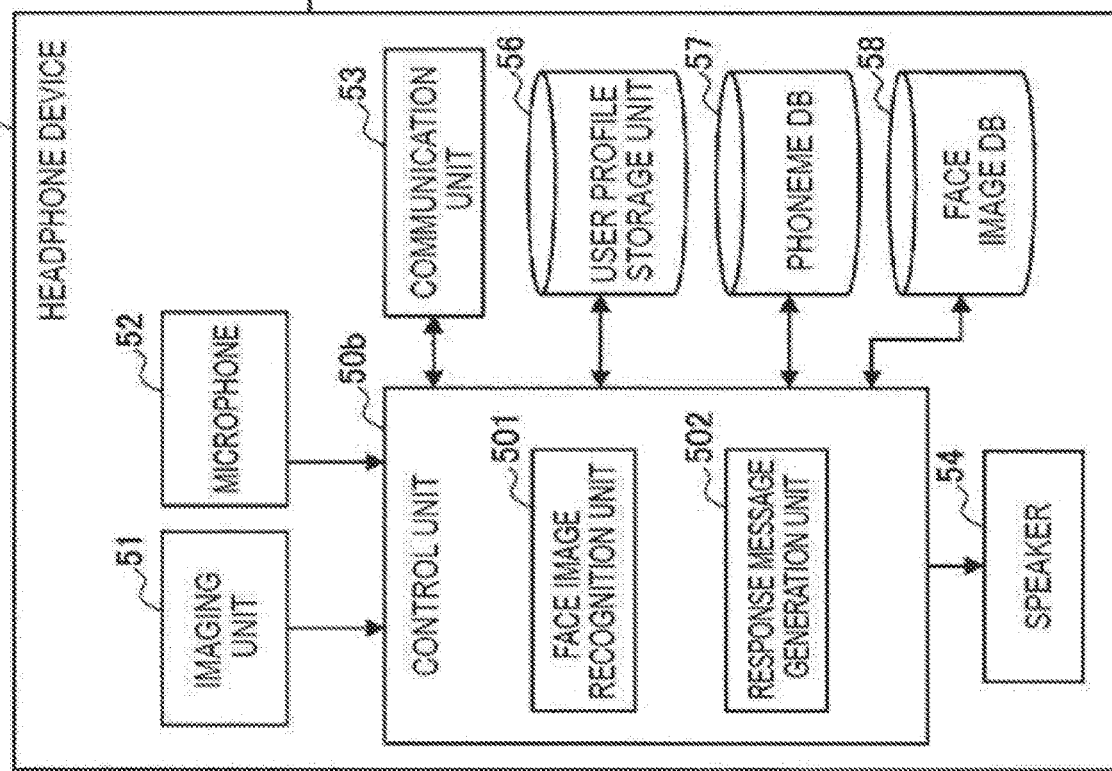
FIG. 33

SERVER, CLIENT TERMINAL, CONTROL METHOD, AND STORAGE MEDIUM

CROSS REFERENCE TO RELATED APPLICATIONS

This application is a continuation application of U.S. patent application Ser. No. 17/592,977, filed on Feb. 4, 2022, which is a continuation application of U.S. patent application Ser. No. 16/328,816, filed on Feb. 27, 2019, now U.S. patent Ser. No. 11/283,915, which is a U.S. National Phase of International Patent Application No. PCT/JP2017/024628 filed on Jul. 5, 2017, which claims priority benefit of Japanese Patent Application No. JP 2016-199028 filed in the Japan Patent Office on Oct. 7, 2016. Each of the above-referenced applications is hereby incorporated herein by reference in its entirety.

TECHNICAL FIELD

The present disclosure relates to a server, a client terminal, a control method, and a storage medium.

BACKGROUND ART

In recent years, technologies of presenting, by using text or sound, information related to a target object that is in a field of view of a user have been proposed. For example, Patent Literature 1 listed below proposes a technology of superimposing and displaying explanation of a target object in a head-mounted display (HMD) worn by a user.

In addition, Patent Literature 2 listed below proposes a chat system for transmitting and receiving a message and an avatar image that reflects a facial expression of a user.

CITATION LIST

Patent Literature

Patent Literature 1:
  JP 2014-167716A
Patent Literature 2:
  JP 2013-9073A

Technical Problem

However, Patent Literature 1 and Patent Literature 2 do not present information related to a target object that the user does not notice.

Therefore, the present disclosure proposes a server, a client terminal, a control method, and a storage medium that are capable of presenting information that a user does not notice.

Solution to Problem

According to the present disclosure, there is proposed a server including: a communication unit configured to receive information related to an image acquired by an imaging unit of a client terminal; and a control unit configured to be capable of extracting information corresponding to an object on the basis of the information related to the image, and transmit information related to the object to the client terminal, the object being positioned outside of a gaze area of a user and being related to user information.

According to the present disclosure, there is proposed a client terminal including: an output unit configured to output information to a user; and a control unit configured to control the output unit such that information related to an object is output in accordance with information corresponding to the object, the object being specified on the basis of information related to an image acquired by an imaging unit, being positioned outside of a gaze area of the user, and being related to user information.

According to the present disclosure, there is proposed a control method that causes a processor to: receive, by a communication unit, information related to an image acquired by an imaging unit of a client terminal; and be capable of extracting information corresponding to an object on the basis of the information related to the image, and transmit information related to the object to the client terminal, the object being positioned outside of a gaze area of a user and being related to user information.

According to the present disclosure, there is proposed a storage medium having a program stored therein, the program causing a computer to function as: an output unit configured to output information to a user; and a control unit configured to control the output unit such that information related to an object is output in accordance with information corresponding to the object, the object being specified on the basis of information related to an image acquired by an imaging unit, being positioned outside of a gaze area of the user, and being related to user information.

Advantageous Effects of Invention

As described above, according to the present disclosure, it is possible to present information that a user does not notice.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating an example of user information accumulated in a user information DB according to the first embodiment.

FIG. 6 is a diagram illustrating an example of object information accumulated in an object information DB according to the first embodiment.

FIG. 19 is a diagram illustrating a specific example of character display according to the first embodiment.

FIG. 20 is a diagram illustrating a specific example for changing a direction of a gaze of a building according to the first embodiment.

FIG. 23 is a diagram illustrating respective structural elements of the information processing system according to the second embodiment.

FIG. 33 is a diagram illustrating an overall configuration of an information processing system according to a third application example of the second embodiment.

MODE(S) FOR CARRYING OUT THE INVENTION

Figure 1:
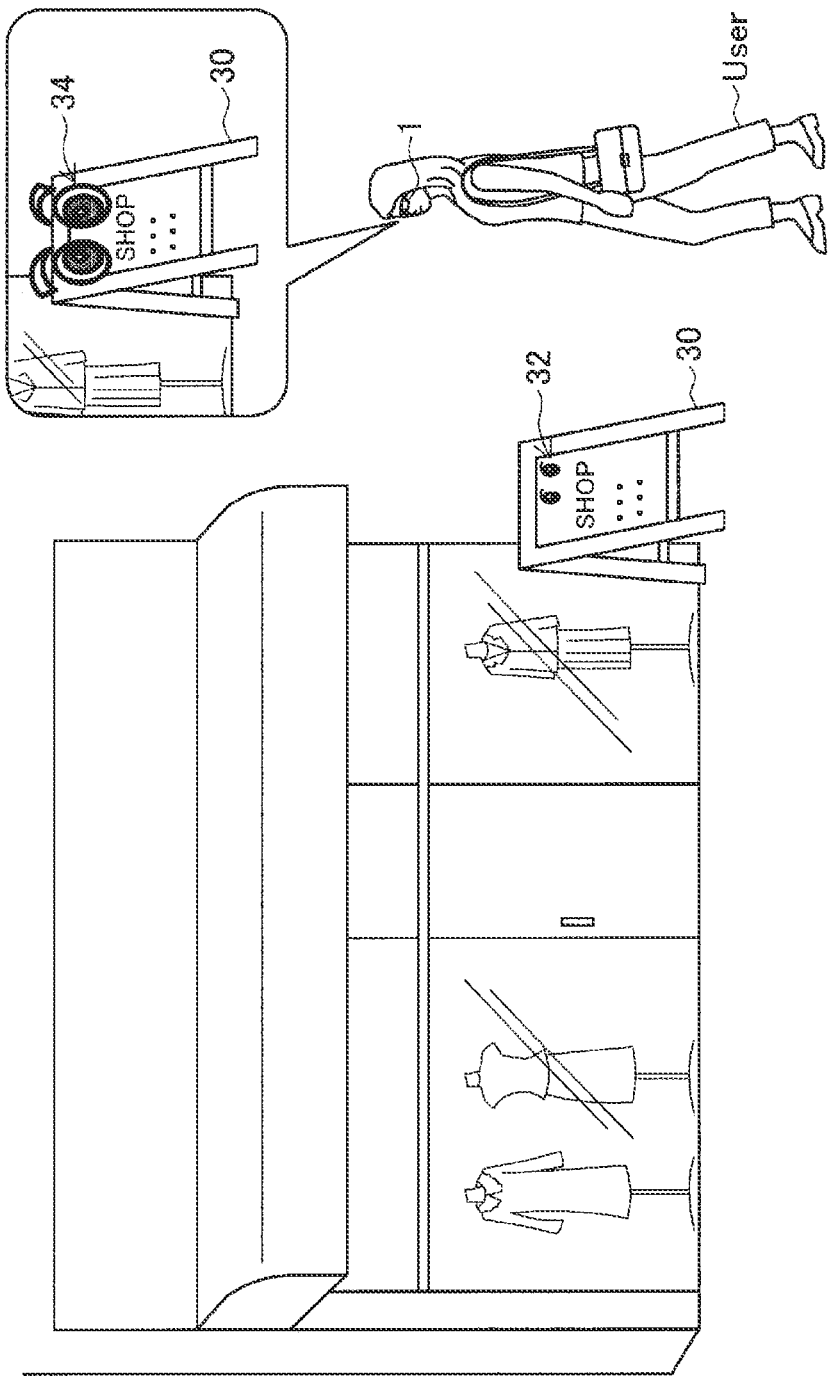
FIG. 1 is a diagram illustrating an overview of an information processing system according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, the description is given in the following order.
1. First Embodiment
1-1. Overview
1-2. Configuration
1-3. Operation process
1-4. Display example
1-5. Supplement
2. Second Embodiment
2-1. Overview
2-2. Configuration
2-3. Operation process
2-4. Application example
2-5. Supplement
3. Conclusion

1. First Embodiment

<1-1. Overview>

FIG. 1 is a diagram illustrating an overview of an information processing system according to a first embodiment of the present disclosure. As illustrated in FIG. 1, when a user wearing a see-through glasses-type terminal 1 (an example of a client terminal) is walking down a street and the user does not gaze on or notice a signboard 30 even while the signboard 30 is in the field on view of the user, a character image 34 is displayed on the signboard 30 by using augmented reality (AR), and voice such as "new skirts have arrived!" is output, for example. The character image 34 represents "eyes" that move to get attention from the user.

More specifically, the glasses-type terminal 1 performs control such that information corresponding to a tag image 32 of the signboard 30 is presented when an imaging unit of the glasses-type terminal 1 extracts the tag image 32. The imaging unit is configured to capture images of the field of view of the user. At this time, the glasses-type terminal 1 performs control such that the information corresponding to the tag image 32 is presented as information that the user has not noticed, in the case where the glasses-type terminal 1 detects a gaze of the user, recognizes a gaze area of the user, and extracts the tag image 32 from at least an area outside of the gaze area, more specifically, an area that is in the field of view of the user but is not recognized by the user. Note that, it is possible to limit presentation information to events that the user is interested in.

Accordingly, it is possible for the user to notice the signboard 30, and it is possible to prevent the user from missing a clothing store that the user is interested in.

Next, a configuration and operation processes of the information processing system according to the first embodiment will be described in detail.

<1-2. Configuration>
(1-2-1. Overall Configuration)

Figure 2:
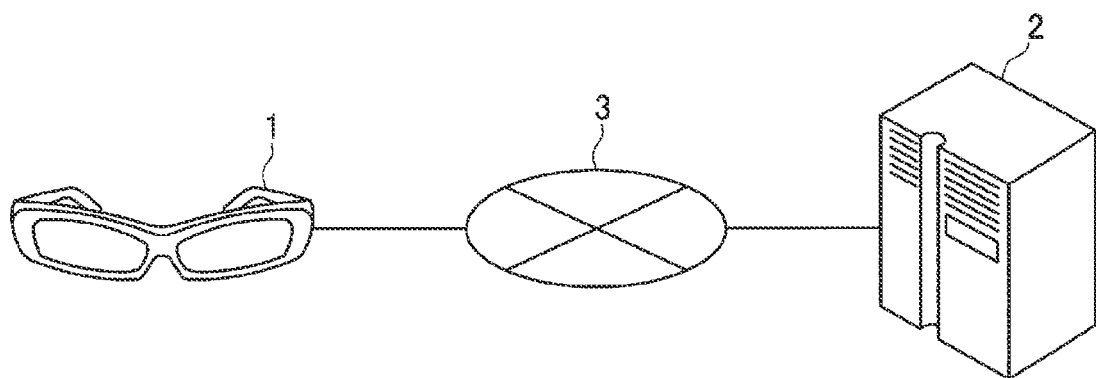
FIG. 2 is a diagram illustrating an overall configuration of the information processing system according to the first embodiment.

FIG. 2 is a diagram illustrating an overall configuration of the information processing system according to the first embodiment. As illustrated in FIG. 2, the information processing system according to the embodiment includes the glasses-type terminal 1 and a server 2. The glasses-type terminal 1 and the server 2 are connected via a network 3, and transmit/receive data.

The glasses-type terminal 1 is a see-through glasses-type head-mounted display (HMD). When the HMD is worn, a pair of see-through display units 13 (FIG. 3) for left and right eyes is disposed in front of the eyes of the user, in other words, disposed at a position where lenses are disposed in the case of using general glasses. Images such as texts, diagrams and the like are displayed on the display units 13 and superimposed on a real space. The HMD is provided with an imaging lens that captures images of a photographic subject direction that is a direction visually recognized by the user when the HMD is worn by the user. It is possible to capture images of the field of view of the user.

Note that, the appearance of the glasses-type terminal 1 illustrated in FIG. 2 is a mere example. A variety of structures for users to wear the glasses-type terminal 1 is considered. It is only necessary to form the glasses-type terminal 1 by a mounting unit that is generally called a glasses-type unit or a head-mounted unit. At least in the present embodiment, it is only necessary to provide the display units 13 near the front of the eyes of the user. In addition, the pair of display units 13 corresponding to the both eyes may be provided, or the only one display unit 13 corresponding to one eye may be provided.

The server 2 has a function of accumulating user information and object information and transmitting, to the glasses-type terminal 1, presentation information corresponding to a tag image extracted by the glasses-type terminal 1.

(1-2-2. Configuration of Glasses-Type Terminal 1)

Figure 3:
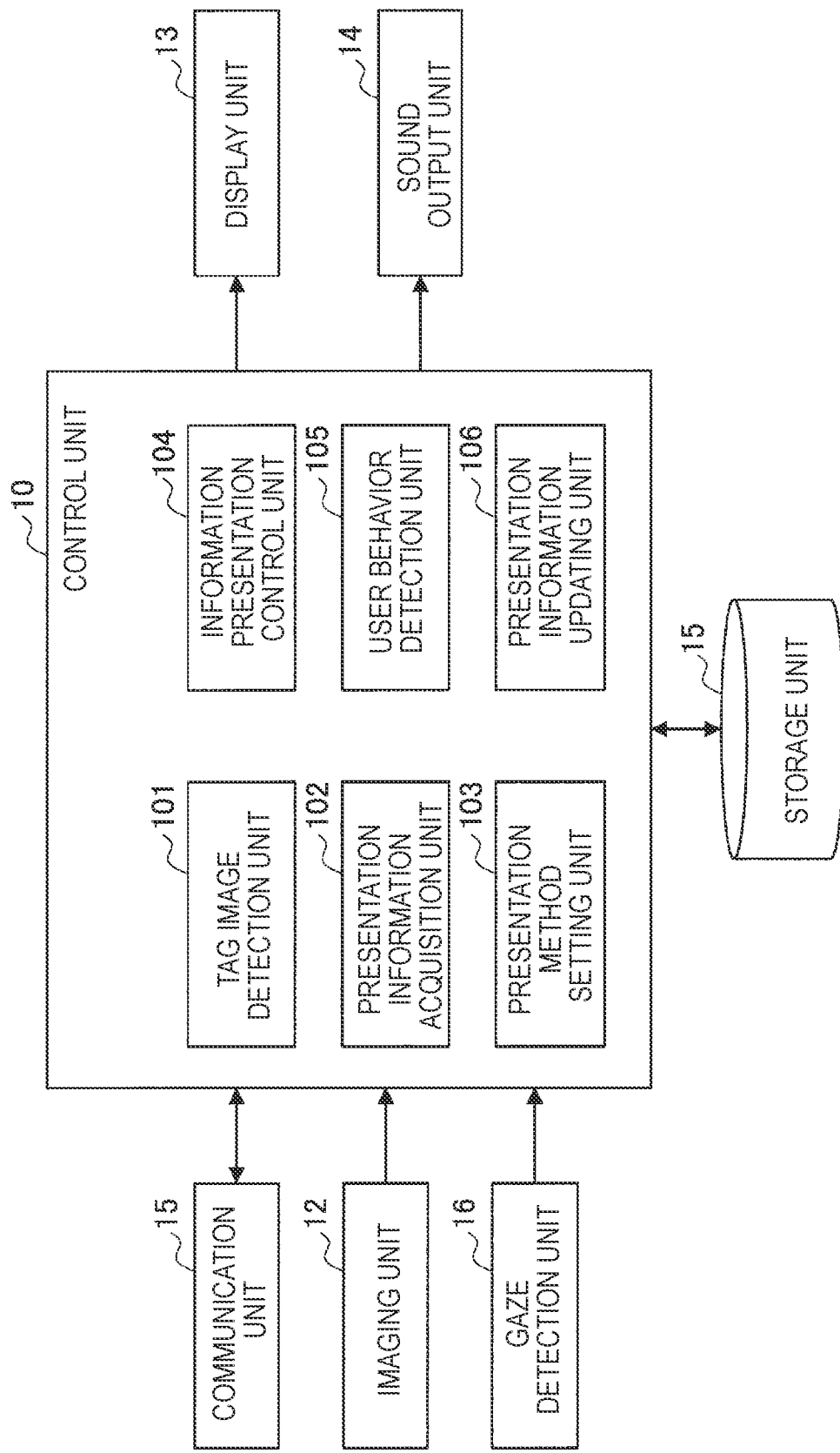
FIG. 3 is a block diagram illustrating an example of a configuration of a glasses-type terminal according to the first embodiment.

Next, with reference to FIG. 3, a configuration of the glasses-type terminal 1 according to the embodiment will be described. FIG. 3 is a block diagram illustrating an example of the configuration of the glasses-type terminal 1 according to the embodiment.

As illustrated in FIG. 3, the glasses-type terminal 1 includes a control unit 10, a communication unit 11, an imaging unit 12, a display unit 13, a sound output unit 14, a storage unit 15, and a gaze detection unit 16.

(Control Unit 10)

The control unit 10 functions as an arithmetic processing device and a control unit, and controls the overall operation in the glasses-type terminal 1 in accordance with various programs. For example, the control unit 10 is implemented by a central processing unit (CPU), and an electronic circuit such as a microprocessor. In addition, the control unit 10 may include read only memory (ROM) for storing programs, arithmetic parameters, and the like to be used, and random access memory (RAM) for temporarily storing parameters and the like that change appropriately.

In addition, the control unit 10 according to the embodiment functions as a tag image detection unit 101, a presentation information acquisition unit 102, a presentation method setting unit 103, an information presentation control unit 104, a user behavior detection unit 105, and a presentation information updating unit 106.

The tag image detection unit 101 analyzes an image captured by the imaging unit 12 and detects a tag image. For example, the tag image is detected by using pattern matching with images that are stored in advance in the storage unit 15. For example, by registering the tag image 32 that is an illustration of eyes illustrated in FIG. 1 on the storage unit 15 in advance, it is possible for the tag image detection unit 101 to detect the illustration of the eyes on the signboard 30 as the tag image 32, from the image captured by the imaging unit 12.

The presentation information acquisition unit 102 acquires presentation information based on the detected tag image from the server 2. Specifically, the presentation information acquisition unit 102 transmits the detected tag image or tag information (specifically, a tag ID or the like) embedded as a digital watermark in the tag image to the server 2, and acquires object information (such as information related to a product) corresponding to the tag information as the presentation information.

The presentation method setting unit 103 sets a method for presenting the object information to the user. Specifically, the presentation method setting unit 103 decides display settings or sound volume settings for presenting the object information in accordance with a degree of attention that has been set.

The information presentation control unit 104 performs control such that the object information acquired by the presentation information acquisition unit 102 is presented to the user by using the method set by the presentation method setting unit 103. Specifically, the information presentation control unit 104 performs control such that the display unit 13 or the sound output unit 14 outputs the object information that is the presentation information.

The user behavior detection unit 105 has a function of detecting behavior of the user and setting a degree of the user's attention to the tag image. For example, the user behavior detection unit 105 sets the degree of attention to a target tag image to "high" in the case where the gaze of the user is directed at the tag image in accordance with the gaze of the user detected by the gaze detection unit 16.

When the degree of attention is changed, the presentation information updating unit 106 acquires new presentation information from the server and updates the presentation information to be presented to the user.

(Communication Unit 11)

The communication unit 11 has a function of connecting with an external device and transmitting/receiving data. For example, the communication unit 11 connects with the network 3 via Bluetooth (registered trademark), Wi-Fi (Wireless Fidelity, registered trademark), a wireless local area network (LAN), or the like, and transmits/receives data to/from the server 2 on the network.

(Imaging Unit 12)

The imaging unit 12 includes a lens system, a drive system, and solid state image sensor array, and the like. The lens system includes an imaging lens, a diaphragm, a zoom lens, a focus lens, and the like. The drive system causes the lens system to carry out focus operation and zoom operation. The solid state image sensor array performs photoelectric conversion on imaging light acquired by the lens system and generates an imaging signal. The solid state image sensor array may be implemented by charge-coupled device (CCD) sensor array or complementary metal-oxide-semiconductor (CMOS) sensor array, for example.

In addition, the imaging unit 12 according to the embodiment is installed such that the imaging unit 12 faces a direction of capturing images of a gaze direction (a field of view) of the user when the user is wearing the glasses-type terminal 1.

(Gaze Detection Unit 16)

The gaze detection unit 16 has a function of detecting a gaze direction of the user who is wearing the glasses-type terminal 1. More specifically, the gaze detection unit 16 detects the gaze direction (in addition, a gaze point) of the user on the basis of movements of the eyes and the head, an attitude, or the like of the user. For example, the movement of the eyes of the user may be analyzed on the basis of captured images of the face or the eyes of the user, a detected eyes electric potential, a detected muscle electric potential, or the like of the user. In addition, the movement or attitude of the head may be detected by a gyro sensor, an acceleration sensor, a geomagnetic sensor (that are not illustrated) or the like installed in the glasses-type terminal 1.

(Display Unit 13)

The display unit 13 is implemented by a liquid crystal panel, for example. The control unit 10 is capable of changing a state of the display unit 13 to a through state, in other words, a transparent or translucent state by controlling transmittance of the liquid crystal panel. Alternatively, the display unit 13 may be implemented by a lens that displays information such as texts, symbols, and images such that they overlap the field of view of the user (the real space) by using a hologram light guide plate technology.

(Sound Output Unit 14)

The sound output unit 14 includes a speaker for reproducing sound signals and an amplifier circuit for the speaker. For example, the sound output unit 14 may be implemented by a pair of earphone speakers and amplifier circuits for the earphone speakers. The pair of earphone speakers may be installed at positions where the earphone speakers are inserted into the right ear opening and the left ear opening of the user when the user is wearing the glasses-type terminal 1. In addition, the sound output unit 14 may be configured as a so-called bone conduction speaker.

(Storage Unit 15)

The storage unit 15 is implemented by read only memory (ROM) and random access memory (RAM). The ROM stores programs, arithmetic parameters, and the like that are used in processes performed by the control unit 10, and the RAM temporarily stores parameters and the like that change appropriately.

The detailed configuration of the glasses-type terminal 1 according to the embodiment has been described above. Note that, the configuration of the glasses-type terminal 1 is not limited to the example illustrated in FIG. 3. For example, the glasses-type terminal 1 may include a microphone for collecting sound, a positional information acquisition unit, or the like. If the glasses-type terminal 1 includes the microphone, it becomes possible for the user to input sound.

In addition, in the present specification, the glasses-type terminal 1 illustrated in FIG. 2 is used as an example of the client terminal for presenting information. However, the client terminal according to the present disclosure is not limited to the glasses-type terminal 1. For example, the client terminal may be a smartphone, a mobile phone terminal, personal digital assistants (PDA), a personal computer (PC), a tablet terminal, or the like. In addition, it is also possible that the glasses-type terminal captures an image of a field of view of the user, detects a gaze, and presents information, and the smartphone or the like performs various kinds of control (tag image detection, presentation information acquisition, presentation method setting, information presentation control, user behavior detection, and presentation information updating). The smartphone or the like is capable of communicating with the glasses-type terminal.

(1-2-3. Configuration of Server 2)

Figure 4:
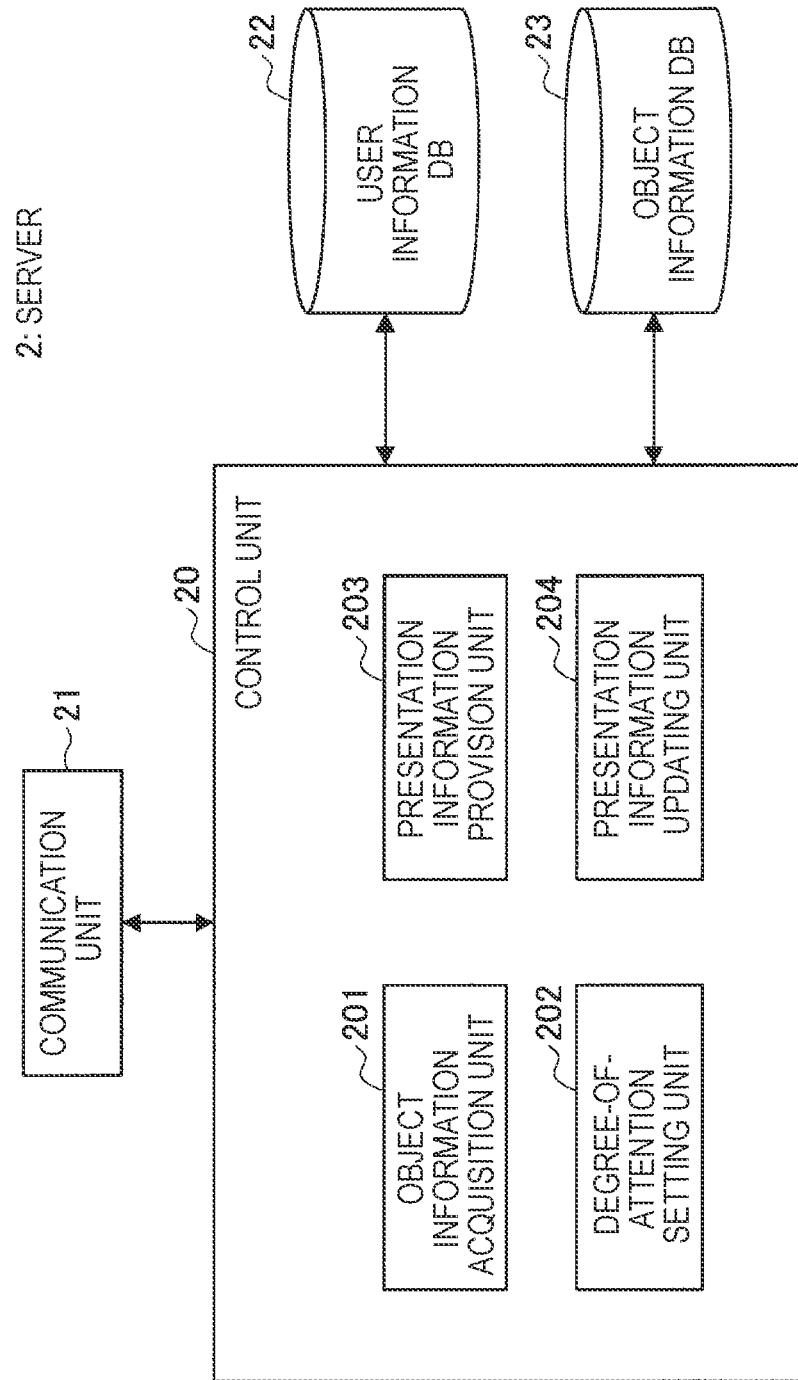
FIG. 4 is a block diagram illustrating an example of a configuration of a server according to the first embodiment.

Next, a configuration of the server 2 according to the embodiment will be described with reference to FIG. 4. As illustrated in FIG. 4, the server 2 according to the embodiment includes a control unit 20, a communication unit 21, a user information database (DB) 22, and an object information DB 23.

(Control Unit 20)

The control unit 20 functions as an arithmetic processing device and a control device, and controls the overall operation in the server 2 in accordance with various kinds of programs. For example, the control unit 20 is implemented by a central processing unit (CPU), and an electronic circuit such as a microprocessor or the like. In addition, the control unit 20 may include read only memory (ROM) for storing programs, arithmetic parameters, and the like to be used, and random access memory (RAM) for temporarily storing parameters and the like that change appropriately.

In addition, the control unit 20 according to the embodiment functions as an object information acquisition unit 201, a degree-of-attention setting unit 202, a presentation information provision unit 203, and a presentation information updating unit 204.

The object information acquisition unit 201 acquires object information from the object information DB 23 on the basis of tag information transmitted from the glasses-type terminal 1.

The degree-of-attention setting unit 202 sets a degree of the user's attention to the acquired object information. Specifically, the degree-of-attention setting unit 202 compares the object information with the user information, and sets a degree of attention in accordance with whether or not sex, age, or preference information (interest information) of the user matches (relates to) attribute information of the object information (object characteristic or target).

The presentation information provision unit 203 acquires information to be presented to the user from the object information in accordance with the set degree of attention, and transmits the presentation information to the glasses-type terminal 1 via the communication unit 21. In addition, the presentation information provision unit 203 also transmits a character image to the glasses-type terminal 1.

The presentation information updating unit 204 updates information to be presented to the user in accordance with the degree of attention changed depending on change in user behavior (specifically, the gaze direction of the user). Specifically, the presentation information updating unit 204 acquires detailed presentation information from the object information in accordance with an update request transmitted from the glasses-type terminal 1, and replies to the glasses-type terminal 1.

(Communication Unit 21)

The communication unit 21 has a function of connecting with an external device and transmitting/receiving data. For example, the communication unit 21 connects with the network 3 via a wireless or wired local area network (LAN) or the like, and transmits/receives data to/from the glasses-type terminal 1 via the network 3.

(User Information DB 22)

The user information DB 22 accumulates information related to users. Here, FIG. 5 illustrates an example of user information accumulated in the user information DB 22. As illustrated in FIG. 5, the user information includes user IDs, sexes, ages, preference information, and the like.

(Object Information DB 23)

The object information DB 23 accumulates information related objects. Here, FIG. 6 illustrates an example of object information accumulated in the object information DB 23. As illustrated in FIG. 6, the object information includes object IDs, tag IDs (tag information), attribute information, presentation information (simple information and detailed information), character images, and characteristic information. The character images may be still images or moving images (animation).

The detailed configuration of the server 2 according to the embodiment has been described above.

<1-3. Operation Process>

Next, with reference to FIG. 7 to FIG. 18, an operation process of the information processing system according to the embodiment will be described.

Figure 7:
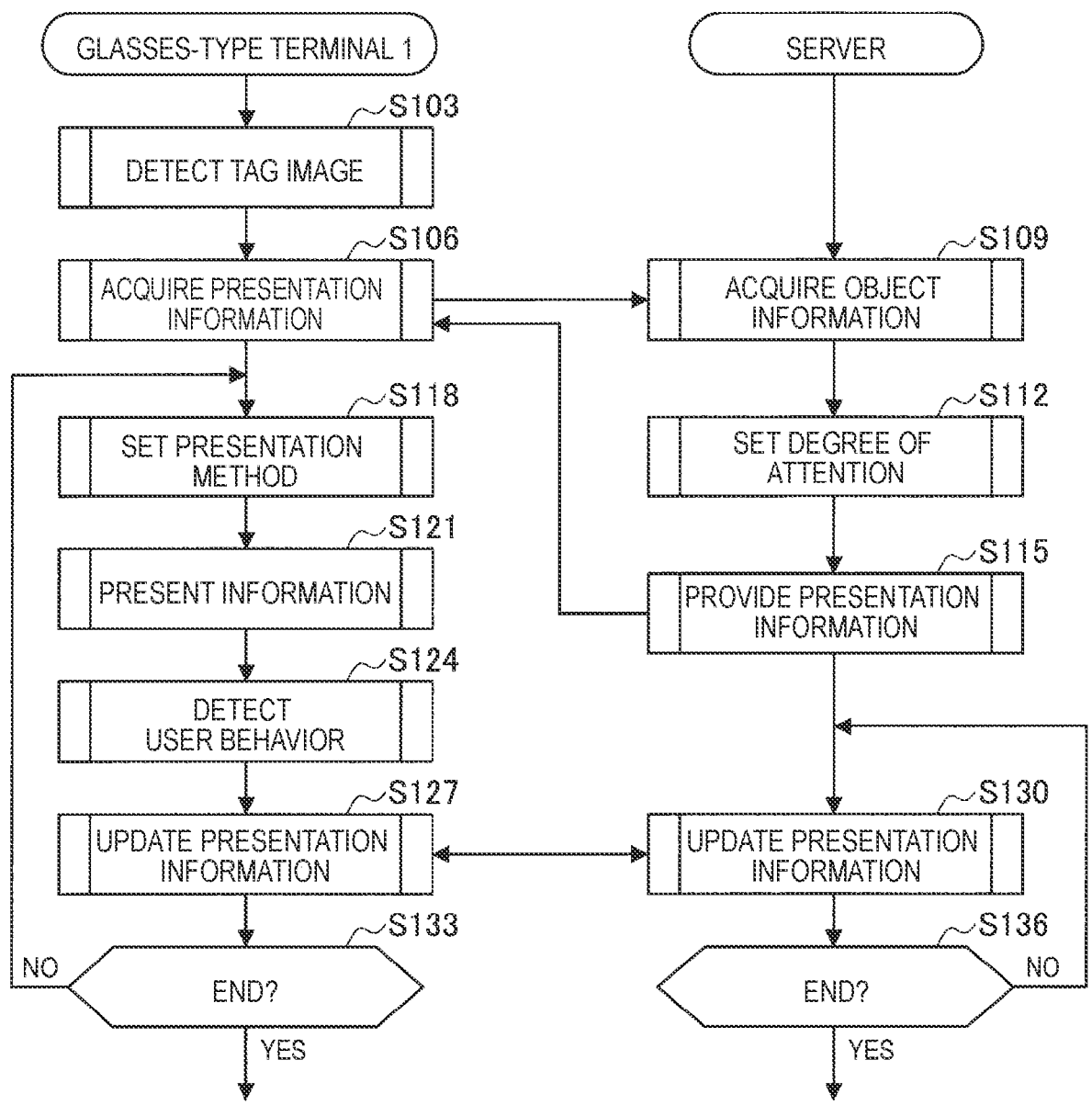
FIG. 7 is a sequence diagram illustrating an operation process of the information processing system according to the first embodiment.

FIG. 7 is a sequence diagram illustrating an operation process of the information processing system according to the embodiment. As illustrated in FIG. 7, first, the tag image detection unit 101 of the glasses-type terminal 1 detects a tag image from an image of the field of view of the user captured by the imaging unit 12 (Step S103). Here, with reference to FIG. 8, details of the tag image detection process according to the embodiment will be described.

Figure 8:
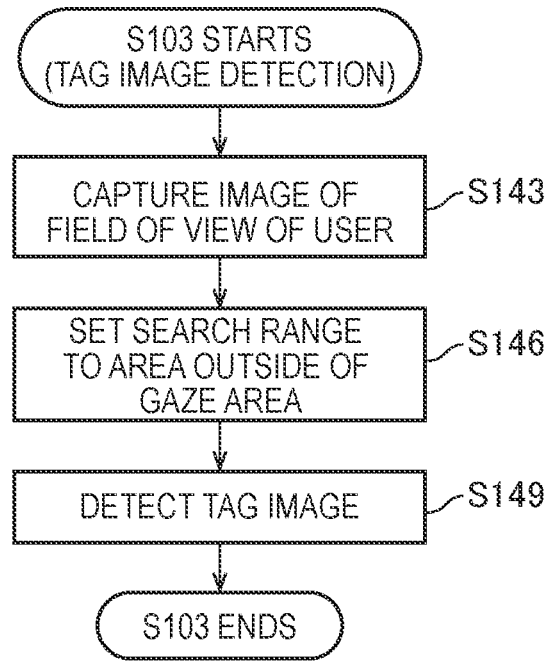
FIG. 8 is a flowchart illustrating a tag image detection process according to the first embodiment.
Figure 9:
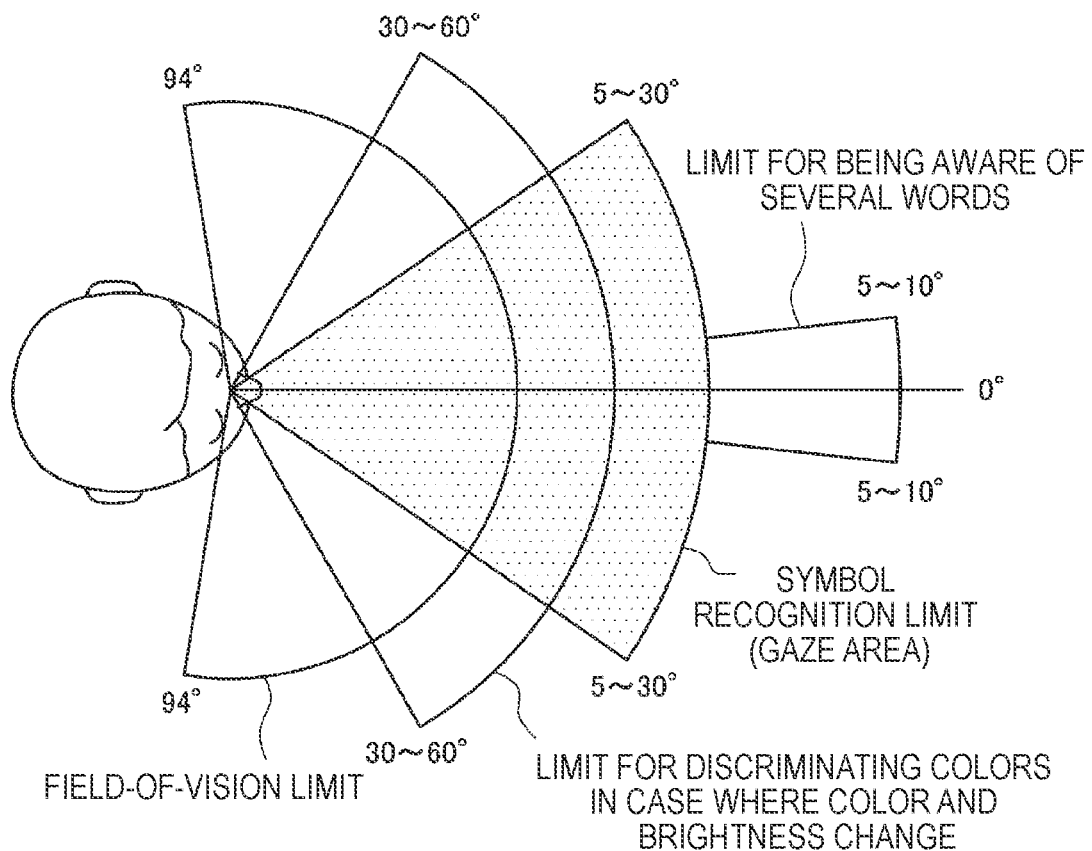
FIG. 9 is a diagram illustrating a field of vision of a standard human.

As illustrated in FIG. 8, when the imaging unit 12 captures an image of the field of view of the user (Step S143), the tag image detection unit 101 sets a tag image search range to an area outside of a gaze area of the user (Step S146). The gaze area of the user is an area around a gaze point of the user detected by the gaze detection unit 16, the area corresponding to a symbol recognition limit in a field of view of a human, for example. In general, with regard to a field of vision of a human, a range of substantially 5 to 10° from the gaze point (0°) in a horizontal direction (right and left directions) is a limit range for being aware of wording (words) such as numbers and texts, as illustrated in FIG. 9. In this range, the human reads the texts or pays attention to a specific thing or event (certainly recognizes a shape, colors, and the like of the thing). In addition, a rage of substantially 5 to 30° from the gaze point (0°) in the horizontal direction (right and left directions) is a symbol recognition limit range. In this range, the human is capable of almost clearly recognizing a thing and an event. In addition, a rage of substantially 30 to 60° is a limit range for discriminating colors in the case where the color and brightness change. In this range, it is impossible to clearly recognize the shape, colors, and the like of the thing, but it is easy to recognize change in the colors or movement of the thing. In addition, a range of substantially 94° from the gaze point (0°) is a field-of-vision limit range. In this embodiment, the symbol recognition limit rage is set as the gaze area, and an area outside of the range of at least the substantially 30° from the gaze point of the user is set as the tag image search range. This is because, in an area outside of the symbol recognition limit range, it is impossible for the user to recognize a thing or event although the area outside of the symbol recognition limit range is within the field of view, and there is higher possibility that the user misses information.

In addition, the tag image detection unit 101 detects a tag image in a range outside of the gaze area in a captured image (Step S149). Specifically, for example, it is possible to use pattern matching to detect an image that matches an image stored in the storage unit 15 in advance, as a tag image.

The tag image detection process has been described above.

Next, the presentation information acquisition unit 102 of the glasses-type terminal 1 acquires the presentation information from the server 2 (Step S106). Here, with reference to FIG. 10, details of the presentation information acquisition process according to the embodiment will be described.

Figure 10:
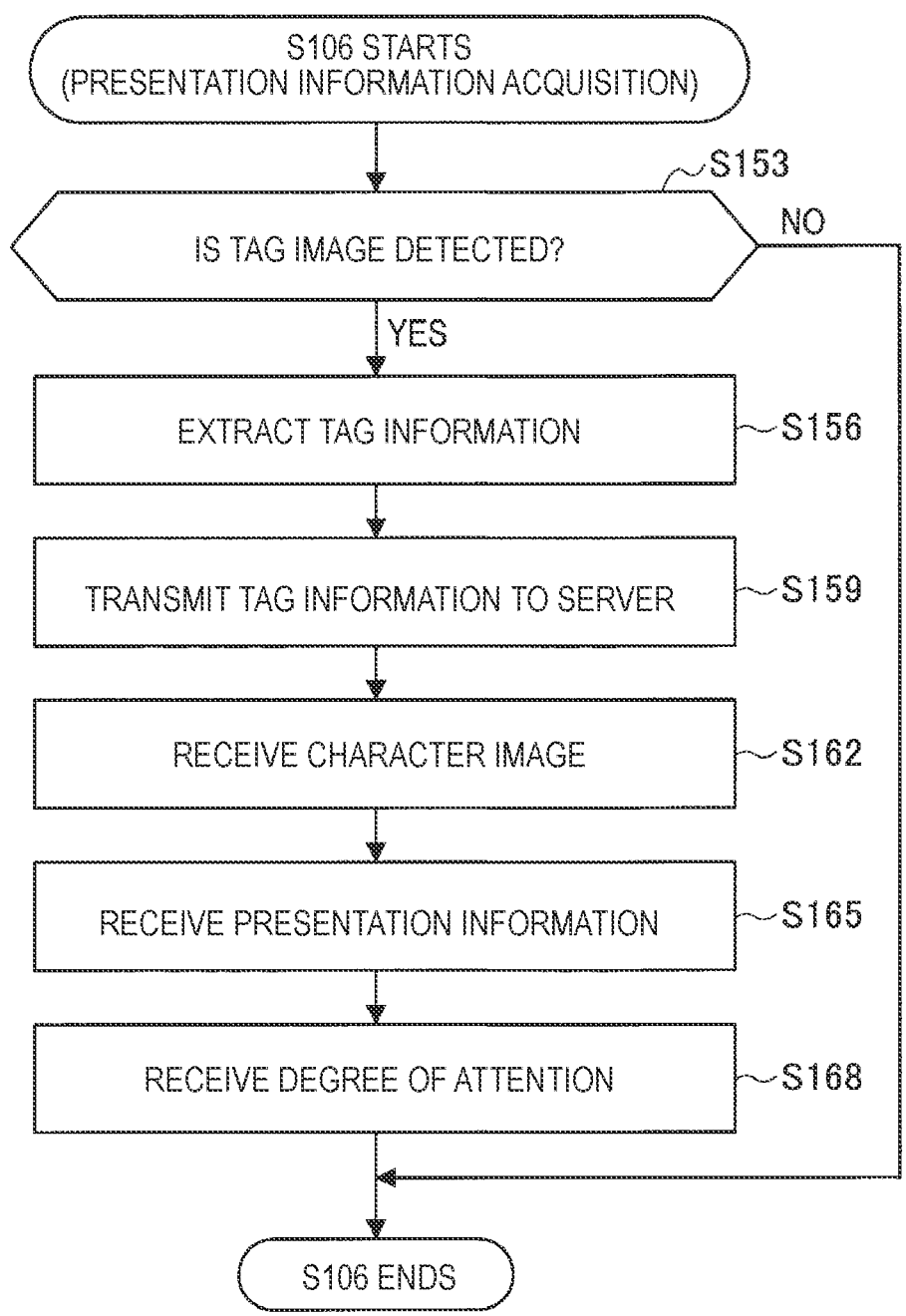
FIG. 10 is a flowchart illustrating a presentation information acquisition process according to the first embodiment.

As illustrated in FIG. 10, in the case where a tag image is detected by the tag image detection unit 101 (YES in Step S153), the presentation information acquisition unit 102 analyzes the detected tag image and extracts tag information (specifically, a tag ID). In the tag image according to the embodiment, it is assumed that the tag information is embedded as a digital watermark, for example. Note that, it is also possible to extract the tag information from a QR code (registered trademark) on the tag image.

Next, the presentation information acquisition unit 102 transmits the tag information to the server 2 via the communication unit 11 (Step S159), and receives a character image corresponding to the tag information from the server 2 (Step S162).

In addition, the presentation information acquisition unit 102 receives, from the server 2, the presentation information based on the tag information and the degree of the user's attention to the presentation information (Step S165 and Step S168).

The presentation information acquisition process has been described above. On the other hand, the server 2 acquires object information on the basis of the tag information transmitted from the glasses-type terminal 1 (Step S109). Here, FIG. 11 illustrates details of the object information acquisition process.

Figure 11:
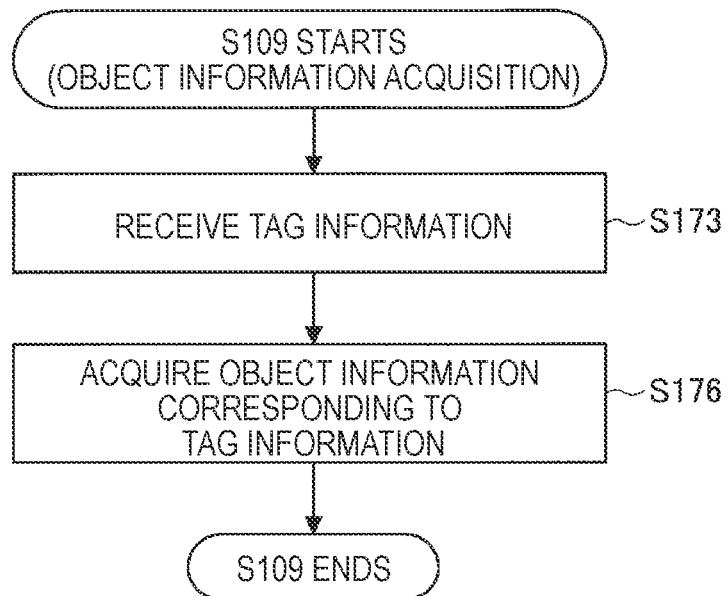
FIG. 11 is a flowchart illustrating an object information acquisition process according to the first embodiment.

As illustrated in FIG. 11, when the server 2 receives the tag information from the glasses-type terminal 1 (Step S173), the object information acquisition unit 201 acquires object information corresponding to the tag information from the object information DB 23 (Step S176). For example, the tag information is a unique tag ID. As illustrated in FIG. 6, it is possible to search for object information on the basis of the tag ID. Note that, in the case where the glasses-type terminal 1 transmits the tag information, it is possible for the object information acquisition unit 201 of the server 2 to analyze the tag image and extract tag information embedded as a digital watermark.

The object information acquisition process has been described above. Next, the degree-of-attention setting unit 202 of the server 2 sets a degree of the user's attention to the acquired object information (Step S112). Here, FIG. 12 illustrates details of the degree-of-attention setting process.

Figure 12:
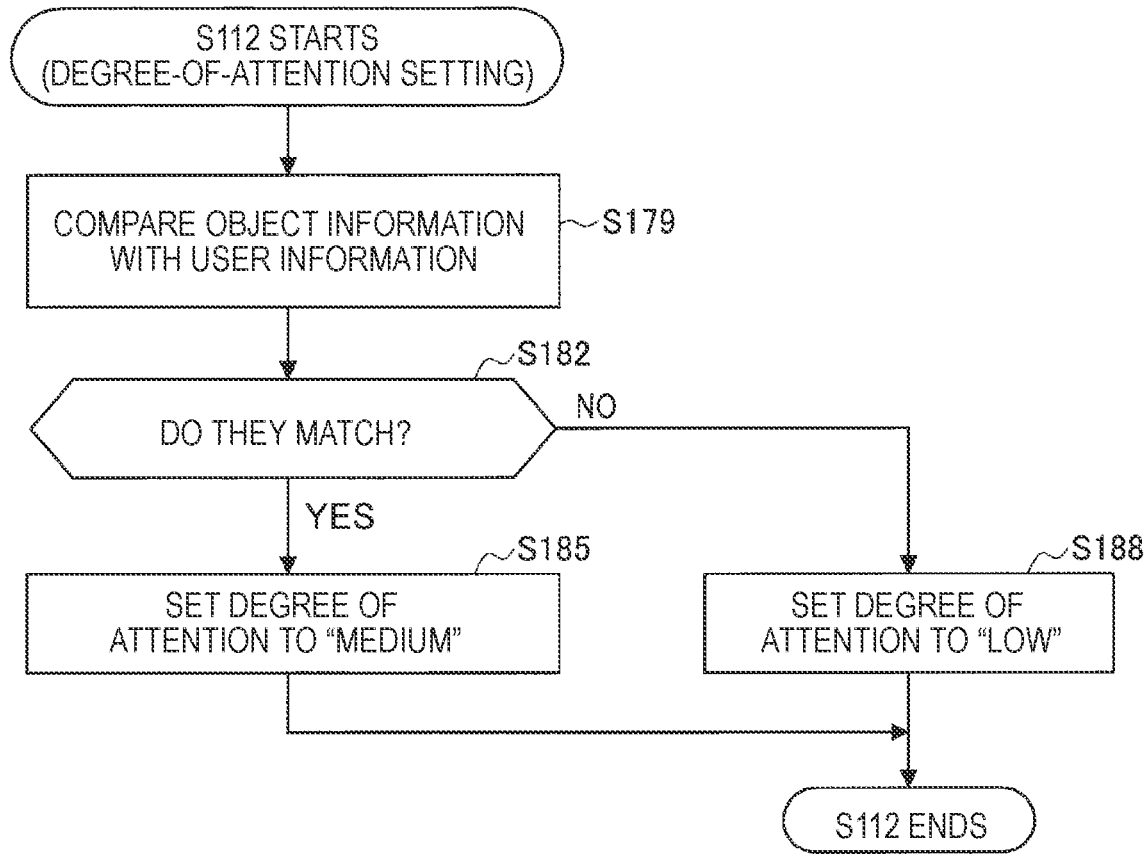
FIG. 12 is a flowchart illustrating a degree-of-attention setting process according to the first embodiment.

As illustrated in FIG. 12, the degree-of-attention setting unit 202 of the server 2 compares the object information with the user information (Step S179), and determines whether they match or not (Step S182). More specifically, for example, the degree-of-attention setting unit 202 compares attribute information of the object information (including information related to characteristics and targets of the object) with the user information (including age, sex and preference information), and determines whether or not there are items that match each other. Therefore, the degree-of-attention setting unit 202 is capable of recognizing a relationship level between the object and the user.

Next, in the case where it is determined that they match each other (YES in Step S182), the degree-of-attention setting unit 202 sets a degree of attention to "medium" (Step S185).

On the other hand, in the case where it is determined that they do not match each other (NO in Step S182), the degree-of-attention setting unit 202 sets the degree of attention to "low" (Step S188).

The degree-of-attention setting process has been described above. Next, the presentation information provision unit 203 of server 2 provides (transmits) the presentation information to the glasses-type terminal 1 (Step S115). Here, FIG. 13 illustrates details of the presentation information provision process.

Figure 13:
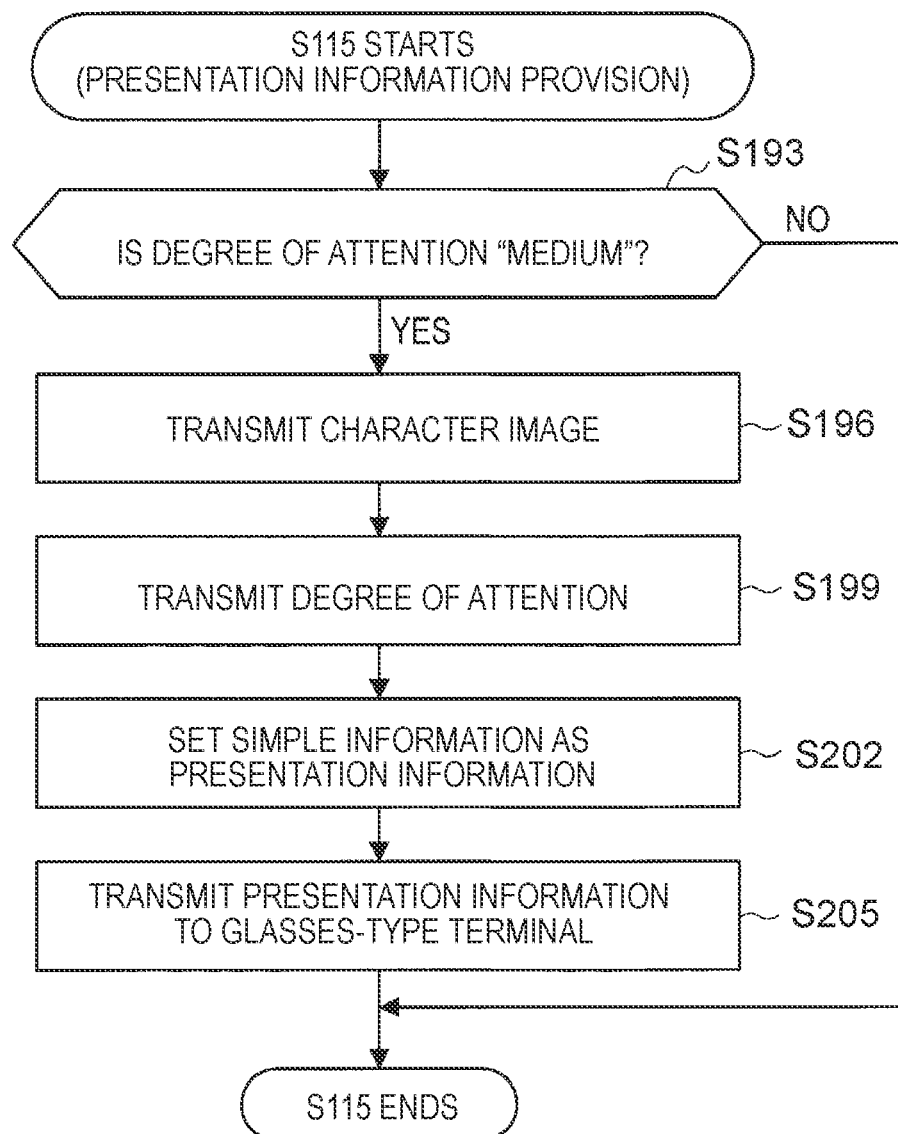
FIG. 13 is a flowchart illustrating a presentation information provision process according to the first embodiment.

As illustrated in FIG. 13, in the case where the set degree of attention is "medium" (YES in Step S193), the presentation information provision unit 203 transmits the character image included in the object information to the glasses-type terminal 1 (Step S196), and transmits the set degree of attention to the glasses-type terminal 1 (Step S199).

Next, among information included in the object information, the presentation information provision unit 203 sets "simple information" as the presentation information (Step S202), and transmits it to the glasses-type terminal 1 (Step S205).

On the other hand, in the case where the set degree of attention is "low" (NO in Step S193), the object information has a low relationship with the user. Therefore, the presentation information or the like is not transmitted to the glasses-type terminal 1.

The presentation information provision process has been described above.

Next, the glasses-type terminal 1 that has received the presentation information from the server 2 uses the presentation method setting unit 103 to set a presentation method (Step S118). Here, FIG. 14 illustrates details of the presentation method setting process.

Figure 14:
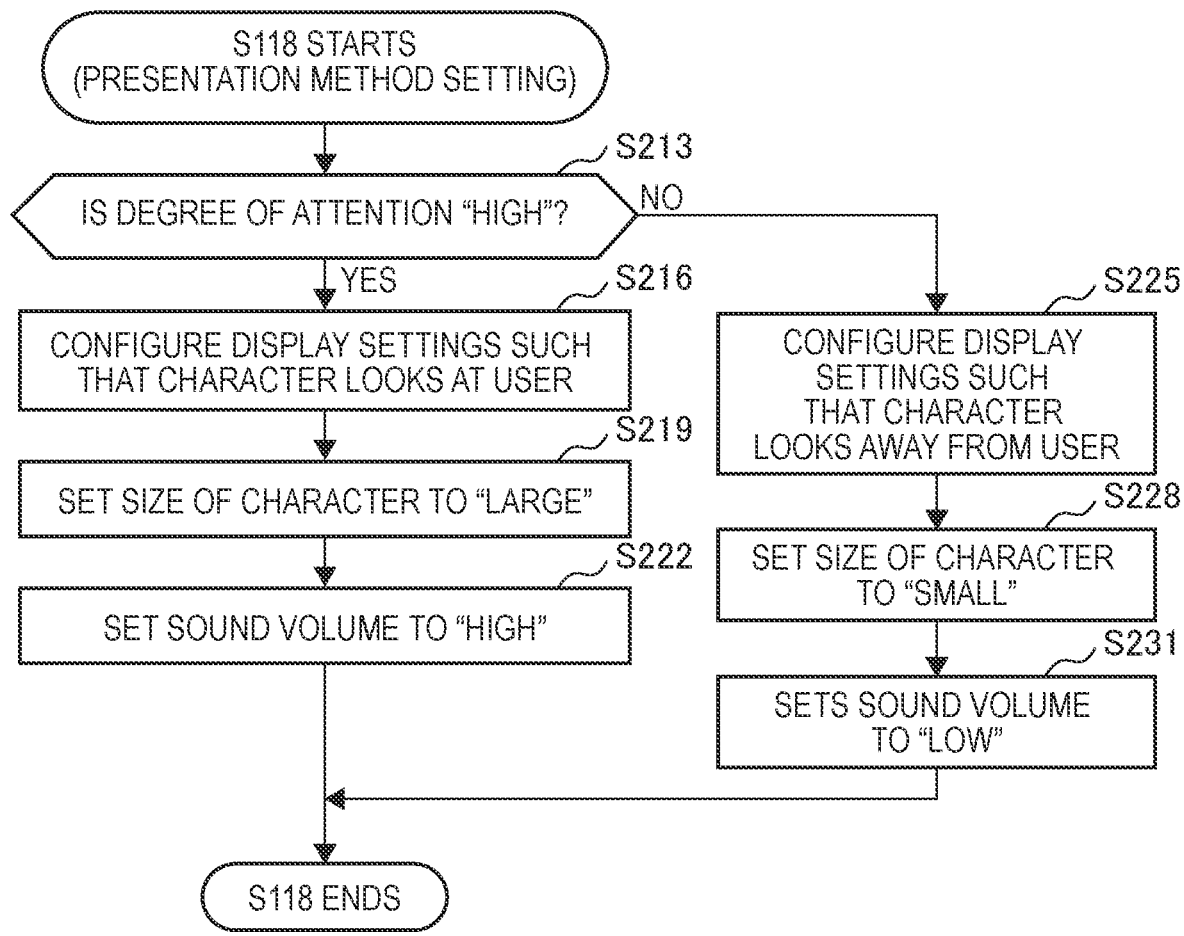
FIG. 14 is a flowchart illustrating a presentation method setting process according to the first embodiment.

As illustrated in FIG. 14, the glasses-type terminal 1 determines whether or not the degree of attention set by the server 2 is "high" (Step S213).

Next, in the case where the degree of attention is not "high" (NO in Step S213), the presentation method setting unit 103 configures display settings such that a character to be provided looks away from the user (Step S225). For example, in the case where the degree of attention is "medium", the probability that the user is interested in (simple presentation information of) the object information is not so high. Therefore, the presentation method setting unit 103 configures display settings such that the character looks away from the user.

Next, the presentation method setting unit 103 sets a size of the character to be presented to "small" (Step S228), and sets a sound volume to "low" (Step S231).

On the other hand, in the case where the degree of attention is "high" (YES in Step S213), the presentation method setting unit 103 configures display settings such that the character to be presented looks at the user (Step S216). For example, in the case where the degree of attention is "high", the probability that the user is interested in (simple presentation information of) the object information is high. Therefore, the presentation method setting unit 103 configures display settings such that the character looks at the user, and this causes the user to easily notice the gaze of the character.

Next, the presentation method setting unit 103 sets the size of the character to be presented to "large" (Step S219), and sets the sound volume to "high" (Step S222). This enables the user to easily notice the character.

The presentation method setting process has been described above.

Next, the glasses-type terminal 1 performs control such that the information presentation control unit 104 presents the presentation information transmitted from the server 2 to the user by using the set presentation method (Step S121). Here, FIG. 15 illustrates details of the information presentation process.

Figure 15:
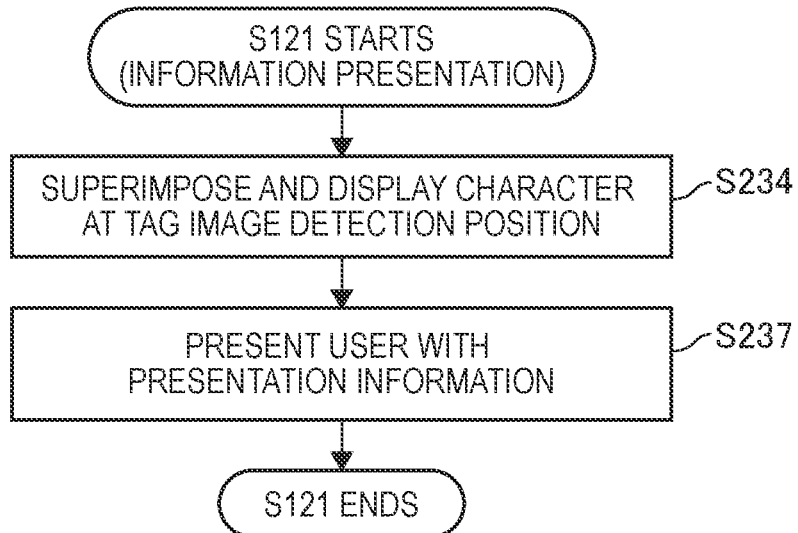
FIG. 15 is a flowchart illustrating an information presentation process according to the first embodiment.

As illustrated in FIG. 15, the glasses-type terminal 1 performs control such that the information presentation control unit 104 superimposes and displays the character at a tag image acquisition position (Step S234). In other words, for example, in the case where the tag image 32 is detected from the signboard 30 as illustrated in FIG. 1, the information presentation control unit 104 superimposes and displays the character image 34 at the position of the signboard 30. The character image 34 may be an animation image that has moving eyes and eyebrows. Even if the character image 34 is displayed outside of the gaze area of the user (such as an outside of the "symbol recognition limit range" illustrated in FIG. 9), it is highly possible that the user recognizes the character image 34 when the character image 34 moves.

Next, the information presentation control unit 104 performs control such that the presentation information received from the server 2 is presented to the user (Step S237). Specifically, for example, the information presentation control unit 104 displays presentation information such as "new skirts have arrived!" near the character image 34, and causes the sound output unit 14 to output sound. The sound volume of the sound to be output is controlled in accordance with the settings of the above-described presentation method.

The information presentation process has been described above.

Next, the user behavior detection unit 105 of the glasses-type terminal 1 detects user behavior (Step S124). Here, FIG. 16 illustrates details of the user behavior detection process.

Figure 16:
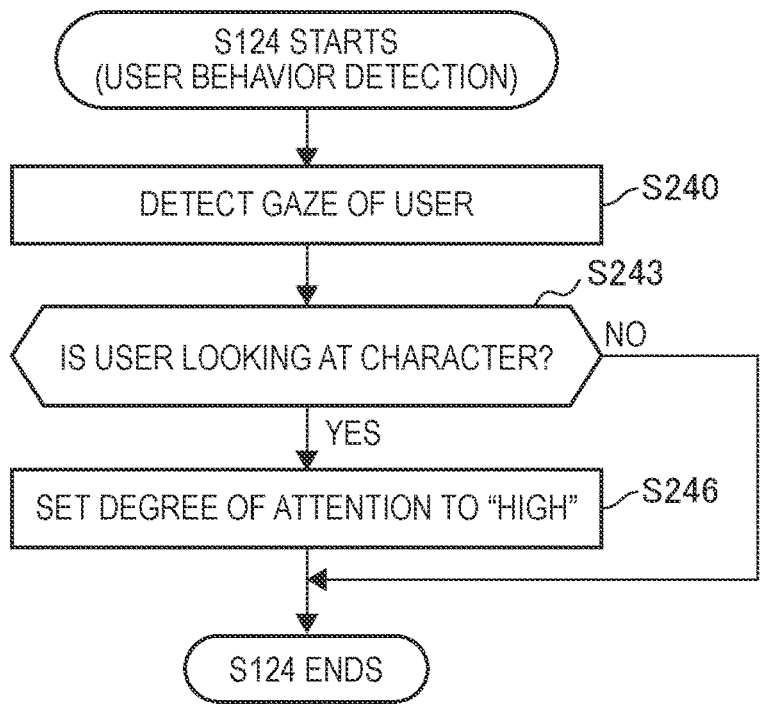
FIG. 16 is a flowchart illustrating a user behavior detection process according to the first embodiment.

As illustrated in FIG. 16, when a gaze of the user is detected by the gaze detection unit 16 (Step S240), the user behavior detection unit 105 determines whether or not the user is looking at the character (specifically, for example, the character is within the gaze area) (Step S243).

Next, in the case where it is determined that the user is looking at the character (YES in Step S243), the user behavior detection unit 105 sets (changes) the degree of attention to "high" (Step S246) since the user is paying attention to the character.

On the other hand, in the case where it is determined that the user is not looking at the character (NO in Step S243), the degree of attention is not changed since the user is not paying attention to the character.

The user behavior detection process has been described above.

Next, the glasses-type terminal 1 performs a presentation information updating process (Step S127). In addition, the server 2 also performs a presentation information updating process in accordance with a request from the glasses-type terminal 1 (Step S130). Here, FIG. 17 illustrates details of the presentation information updating process performed by the glasses-type terminal 1, and FIG. 18 illustrates details of the presentation information updating process performed by the server 2.

Figure 17:
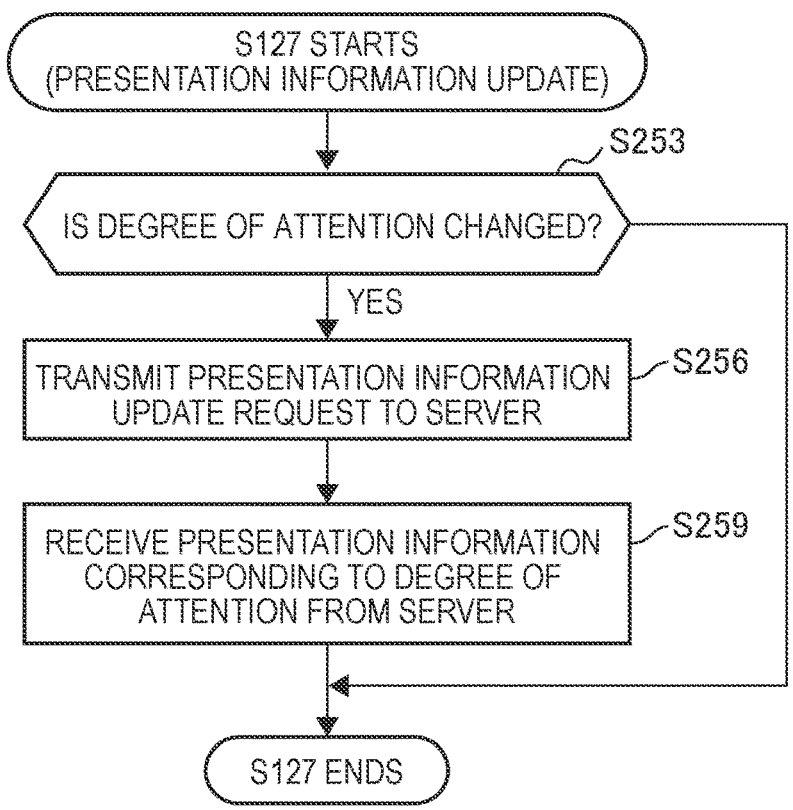
FIG. 17 is a flowchart illustrating a presentation information updating process performed by the glasses-type terminal according to the first embodiment.

As illustrated in FIG. 17, in the case where the degree of attention is changed on the basis of the user's gaze on the character image that is superimposed and displayed (YES in Step S253), the presentation information updating unit 106 of the glasses-type terminal 1 transmits a presentation information update request (information related to the user's gaze on the character that is superimposed and displayed) to the server 2 (Step S256). As described with reference to FIG. 16, it is assumed that a degree of attention is changed to "high" according to the embodiment.

In addition, the glasses-type terminal 1 receives presentation information corresponding to the degree of attention that has been changed, from the server 2 (Step S259).

Figure 18:
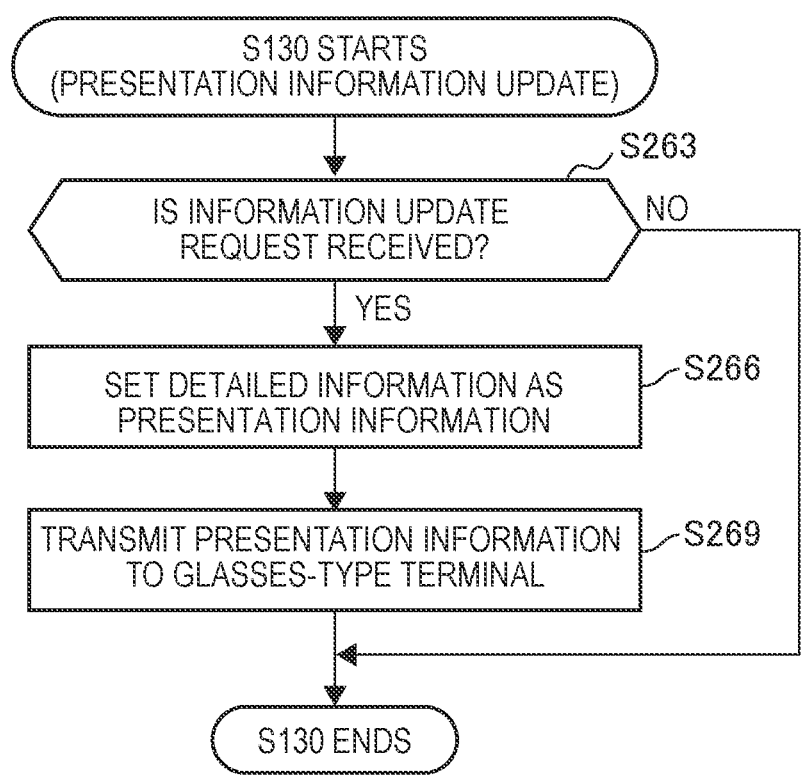
FIG. 18 is a flowchart illustrating a presentation information updating process performed by the server according to the first embodiment.

On the other hand, as illustrated in FIG. 18, in the case where the server 2 receives the information update request from the glasses-type terminal 1 (YES in Step S263), the presentation information updating unit 204 sets "detailed information" (for example, information such as "new summer flared skirts have arrived!") as the presentation information among information included in the object information (Step S266), and transmits the presentation information to the glasses-type terminal 1 (Step S269).

As described above, when the user looks at the character, the glasses-type terminal 1 changes the degree of attention to "high", and receives the detailed information from the server 2.

In addition, the glasses-type terminal 1 sets a presentation method again (Step S118). When setting the presentation method, display settings for causing the character to look at the user, settings for changing the display size of the character to "large", and settings for changing the sound volume to "high" may be configured on the basis that the degree of attention is changed to "high". Next, the detailed information is presented in accordance with the set presentation method (Step S121).

The above-described Step S118 to Step S133 are repeated until a predetermined end condition is satisfied such as turning off of a power source, or the like (Step S133 and Step S136).

The operation process according to the embodiment has been described above. Note that, it is also possible for the information processing system according to the embodiment to personalize the detailed information to be presented to the user. For example, in the case where a bag held by the user is recognized on the basis of an image captured by a camera installed around the user, the server 2 sets personalized detailed information as the presentation information and transmits the personalized detailed information to the glasses-type terminal 1, the personalized detailed information indicating that "New summer flared skirts have arrived! Why don't you pair it with your shoulder pouch!". In addition, it is also possible for the server 2 to personalize the detailed information with reference to characteristic information included in the object information. For example, if the characteristic information of the object information indicates that "this is easy to match a monochrome bag" and the user is holding a monochrome bag, information indicating that "this is easy to match your bag" is added to the detailed information.

In addition, the information processing system according to the embodiment is capable of performing an operation process corresponding to operation or sound input by the user. For example, as illustrated in FIG. 1, when the character image 34 is displayed on the signboard 30 by using AR and sound indicating that "new summer flared skirts have arrived!" is output, it is possible for the user to input "what kind of designs the skirts have?", "please show me the pictures" or the like by voice to clearly request more detailed information if the user is interested in the skirts. When the microphone (not illustrated) collects the user's voice and a semantic analysis is performed using a speech recognition process, the glasses-type terminal 1 is capable of collecting information from the server 2 or a web page of a shop on the network, displaying the pictures of the skirts, and describing details of the designs that has been questioned, by voice or text. As described above, the glasses-type terminal 1 according to the embodiment is capable of enhancing advertising effects of presenting missed information more by responding to the question from the user who is interested in the skirts.

<1-4. Display Example>

In the above-described embodiment, the character image of the "eyes" is used as illustrated in FIG. 1. However, the embodiment is not limited thereto. For example, it is possible to perform AR display using simulacra by detecting parts similar to eyes as a tag image with regard to a building shown in a captured image of the field of view of the user and displaying a character image of a "mouth" under the parts similar to the eyes using AR. Next, a detailed example thereof will be described with reference to FIG. 19.

FIG. 19 is a diagram illustrating a specific example of character display according to the embodiment. As illustrated in the top of FIG. 19, in the case where a headlamp part 36 of a vehicle is detected as a tag image, the glasses-type terminal 1 displays a character image 42 of a "mouth" under the headlamps by using AR. Accordingly, the vehicle seems to be a face and it is possible to easily attract attention from the user.

In addition, as illustrated in the middle of FIG. 19, in the case where a two-window part 38 of a building is detected as a tag image, the glasses-type terminal 1 displays a character image 43 of a "mouth" under the windows by using AR. Accordingly, the house seems to be a face and it is possible to easily attract attention from the user.

In addition, as illustrated in the bottom of FIG. 19, in the case where two faucet handles 40 in a lavatory are detected as a tag image, the glasses-type terminal 1 displays a character image 44 of a "mouth" under the faucet handles by using AR. Accordingly, the lavatory seems to be a face and it is possible to easily attract attention from the user.

The character images 42 to 44 of "mouth" may be still images or moving images (animation).

In addition, in the above-described embodiment, it is possible to control the character image of the "eyes" and cause the character to look at the user or look away from the user. On the other hand, with regard to the AR display using simulacra as illustrated in FIG. 19, it is also possible to change a gaze direction of a building that seems to be a face, by using a direction of the character image of "mouth" or a character image of "nose". Next, details thereof will be described with reference to FIG. 20.

FIG. 20 is a diagram illustrating a specific example for changing a direction of a gaze of a building according to the embodiment. In the example on the left side of FIG. 20, a character image 45a of a "nose" and a character image 46a of a "mouth" are displayed using AR such that they face the right direction. Accordingly, it is possible to show the house as if it faces to the right (as if the house looks away from the user). On the other hand, in the example on the right side of FIG. 20, a character image 45b of a "nose" and a character image 46b of a "mouth" are displayed using AR such that they face the front direction. Accordingly, it is possible to show the house as if it faces to the front direction (as if the house looks at the user).

<1-5. Supplement>

In the first embodiment described above, the presentation information acquisition process is performed in the case where a tag image is detected from images of the field of view that are continuously captured by the imaging unit 12 of the glasses-type terminal 1 as described with reference to FIG. 7. Therefore, it is necessary for the power source of the imaging unit 12 to be always in the ON position. However, the embodiment is not limited thereto. For example, it is possible to turn on the power source of the imaging unit 12 in the case where a range of the field of vision of the user is estimated on the basis of current positional information and direction information acquired by the positional information acquisition unit (not illustrated) and the gyro sensor (not illustrated) of the glasses-type terminal 1 while the power source of the imaging unit 12 is in the OFF position, and the range of the field of vision includes a tag image. Next, the following description will be given with reference to FIG. 21.

Figure 21:
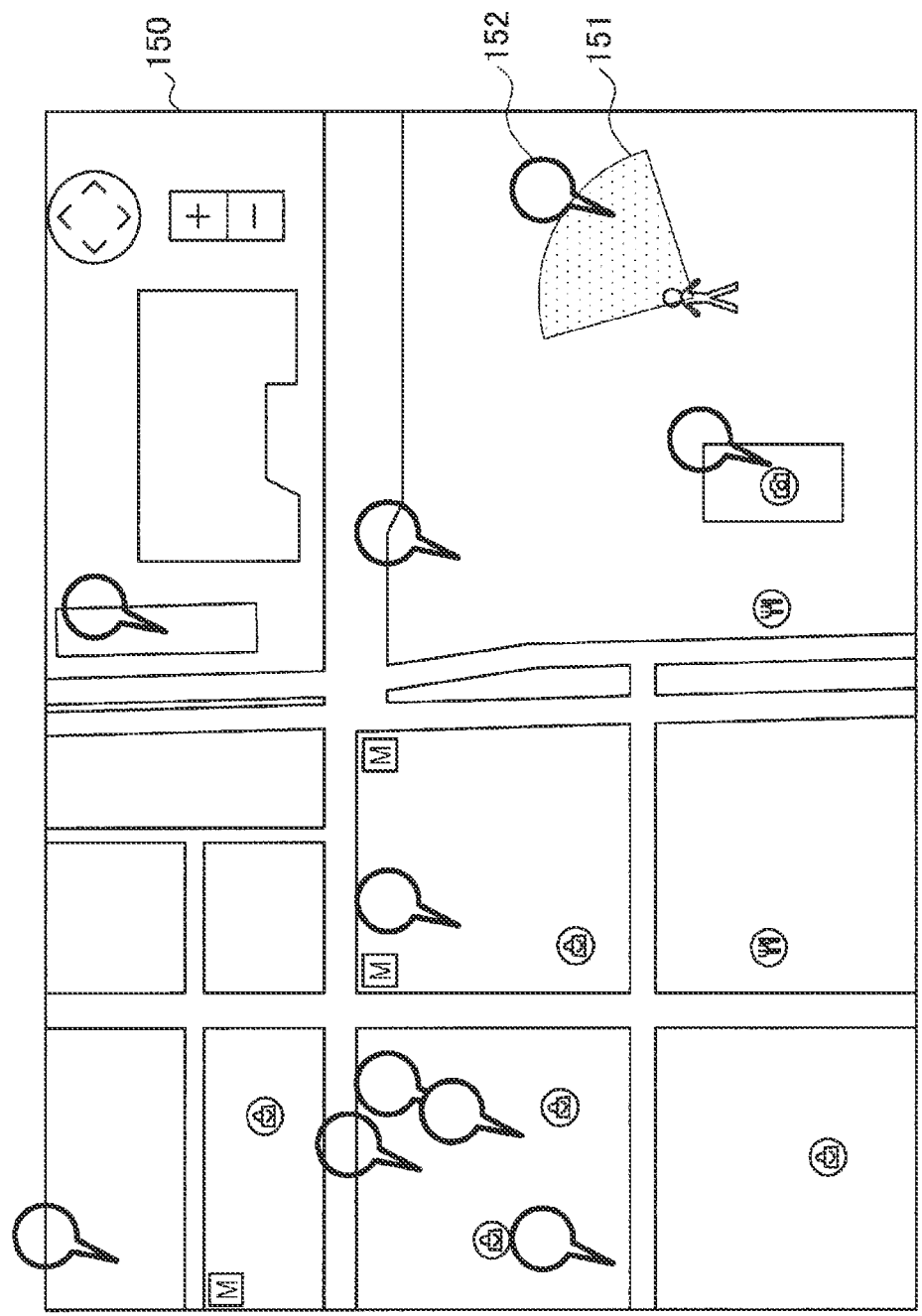
FIG. 21 is a diagram illustrating an example of tag image map data according to the first embodiment.

FIG. 21 is a diagram illustrating an example of tag image map data. The tag image map data 150 illustrated in FIG. 21 is stored in the storage unit 15 of the glasses-type terminal 1, for example. The control unit 10 of the glasses-type terminal 1 is capable of estimating the range of the field of vision 151 of the user on the basis of the current positional information and direction information while using the tag image map data 150, and capable of determining that the range of the field of vision 151 includes a tag image 152.

In the case where it is determined that the range of the field of vision 151 includes the tag image 152, the control unit 10 turns on the power source of the imaging unit 12, captures an image of the range of the field of view of the user, detects a tag image, transmits tag information extracted from the tag image to the server 2, and acquires presentation information. In addition, it is possible to display the character image at a position of the tag image by using AR and presenting the presentation information to the user.

Note that, the tag image map data may be stored in the server 2. In this case, the glasses-type terminal 1 transmits the current positional information and direction information to the server 2, and asks whether or not there is a tag image. Subsequently, the server determines whether there or not is a tag image, and returns a result of the determination to the glasses-type terminal 1.

2. Second Embodiment

<2-1. Overview>

Next, a second embodiment of the present disclosure will be described. In the first embodiment described above, the character images of "eyes" and "mouth" are displayed using AR when the image is detected in the real space so as to prevent the user from being unaware of a point in the real space. However, the present disclosure is not limited thereto. For example, it is possible to notify the user and prevent the user from being unaware of his/her friend who is near the user but not recognized by the user, when a registered face (an example of information corresponding to the object (such as a friend)) like a friend or the like of the user is detected in at least an area outside of the gaze area (hereinafter, also referred to as an outside of the field of vision).

Figure 22:
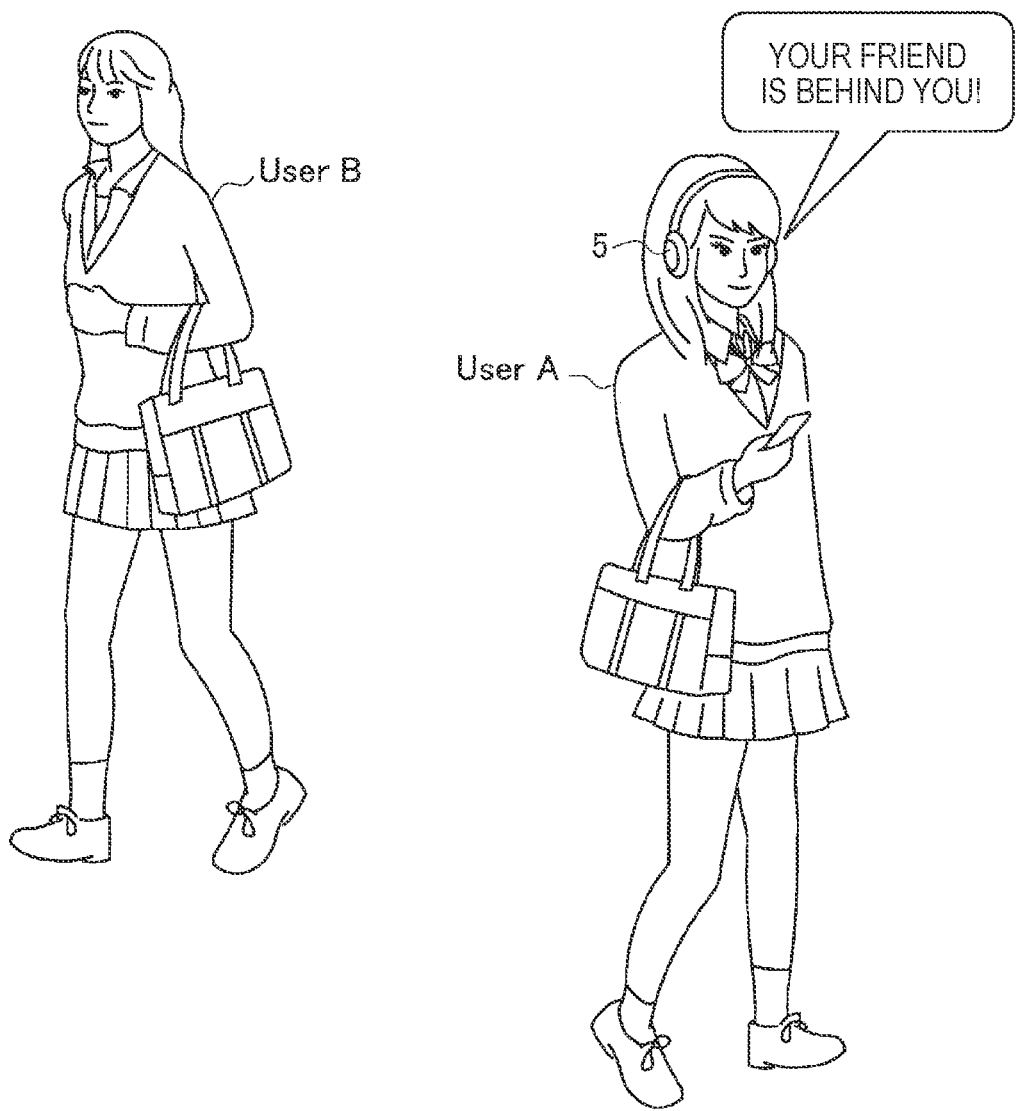
FIG. 22 is a diagram illustrating an overview of an information processing system according to a second embodiment.

FIG. 22 is a diagram illustrating an overview of an information processing system according to the second embodiment. As illustrated in FIG. 22, according to the embodiment, it is possible for a vocal agent of a headphone device 5 (an example of a client terminal) to vocally notify a user A of existence of a friend (a user B) of the user while the user A is walking, for example. The headphone device 5 is worn by the user A, and the user B is outside of the field of view of the user A although the user B is near the user A. The headphone device 5 includes a vocal agent function that carries out conversations with the user A by artificial voice. The headphone device 5 provides the user with various kinds of information such as route guide or music reproduction. The vocal conversations between the user and the agent are carried out using a microphone 52 and a speaker 54 installed in the headphone device 5 (see FIG. 23).

In addition, the headphone device 5 includes an imaging unit 51 (see FIG. 23 and FIG. 24) that captures images of at least an area outside of the field of view of the user A (specifically, outside of the gaze area). The headphone device 5 continuously captures images of surrounding areas by using the imaging unit 51, and notifies the user A when a pre-registered face (here, the face of the user B) is detected in the captured image. The registered face may be detected by a server 6 (see FIG. 23) on a network. The server 6 is capable of communicating with the headphone device 5.

Accordingly, it is possible for the headphone device 5 according to the embodiment to notify a user and prevent the user from being unaware of a predetermined person when the predetermined person is found around the user.

<2-2. Configuration>

Next, with reference to FIG. 23, respective structural elements of the information processing system according to the embodiment will be described. As illustrated in FIG. 23, the information processing system according to the embodiment includes the headphone device 5 and the server 6. The headphone device 5 and the server 6 may be connected via a network 7, and transmit/receive data. Next, detailed configurations of the respective devices will be described.

(2-2-1. Configuration of Headphone Device 5)

As illustrated in FIG. 23, the headphone device 5 according to the embodiment includes a control unit 50, an imaging unit 51, a microphone 52, a communication unit 53, and a speaker 54.

The control unit 50 functions as an arithmetic processing device and a control device, and controls overall operation in the headphone device 5 in accordance with various kinds of programs. For example, the control unit 50 is implemented by an electronic circuit such as a CPU or a microprocessor. In addition, the control unit 50 may include ROM for storing programs, arithmetic parameters, and the like to be used, and RAM for temporarily storing parameters and the like that change appropriately.

In addition, the control unit 50 according to the embodiment performs control such that user voice collected by the microphone 52 is transmitted to the server 6, and the speaker 54 outputs a response message (in other words, agent voice) received from the server 6. Therefore, it is possible to provide a vocal conversation service with the agent. In addition, the control unit 50 performs control such that images captured by the imaging unit 51 are continuously transmitted to the server 6 via the communication unit 53.

The imaging unit 51 includes a lens system, a drive system, solid state image sensor array, and the like. The lens system includes an imaging lens, a diaphragm, a zoom lens, a focus lens, and the like. The drive system causes the lens system to carry out focus operation and zoom operation. The solid state image sensor array performs photoelectric conversion on imaging light acquired by the lens system to generate an imaging signal. The solid state image sensor array may be implemented by CCD sensor array or CMOS sensor array, for example.

In addition, the imaging unit 51 according to the embodiment is installed such that the imaging unit 51 faces a direction of capturing images of areas around the user (at least an area outside of the field of view of the user) when the user is wearing the headphone device 5. In addition, a plurality of the imaging units 51 may be installed. Next, with reference to FIG. 24 to FIG. 25, an installation example of the imaging units 51 will be described.

Figure 24:
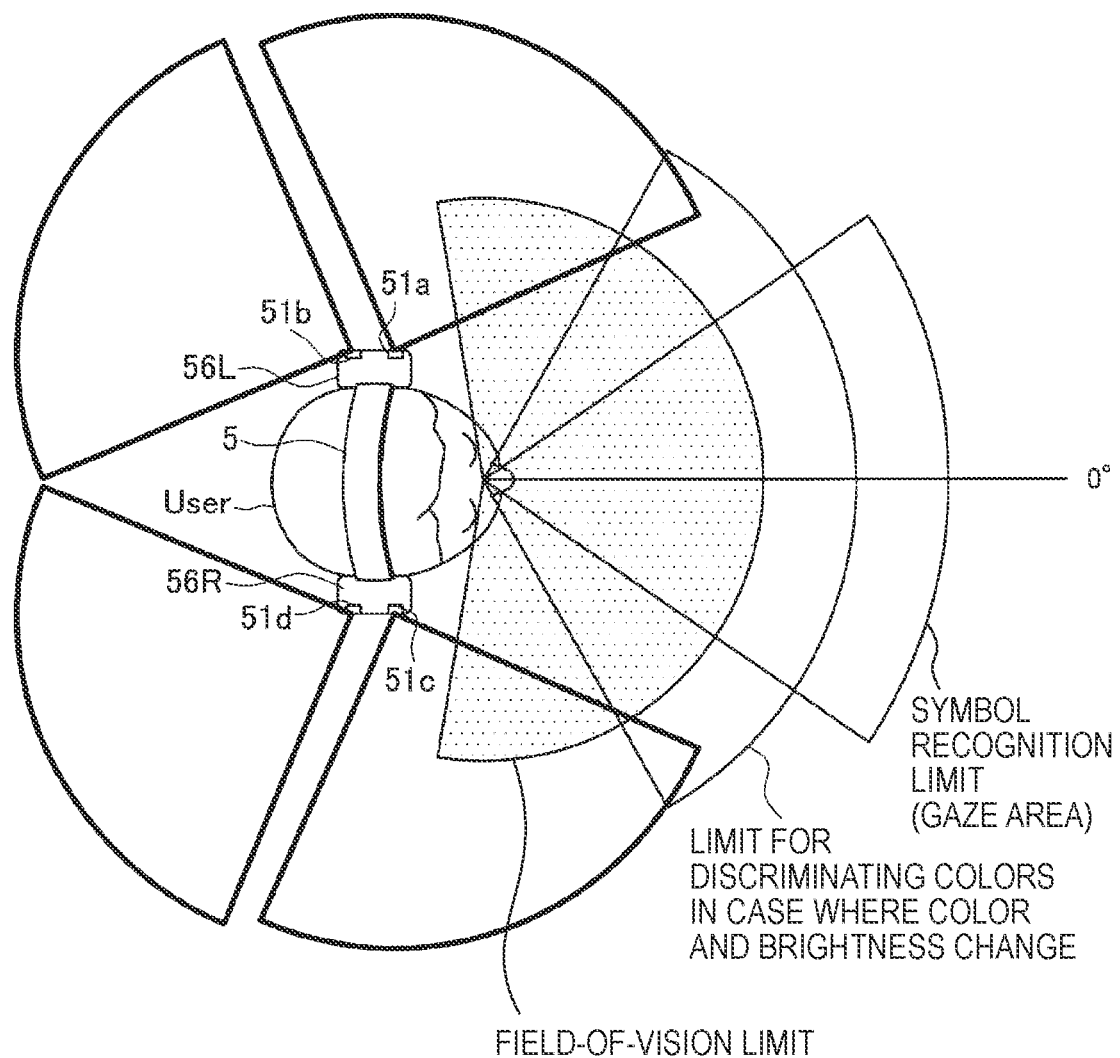
FIG. 24 is a diagram illustrating an installation example of imaging units according to the second embodiment.

FIG. 24 is a diagram illustrating an installation example of imaging units 51 according to the embodiment. For example, as illustrated in FIG. 24, each of imaging units 51a to 51d may have an angle of view of 90°, and two of the imaging units 51a to 51d may be installed on a right housing unit 56R of the headphone device 5 and the other two of the imaging units 51a to 51d may be installed on a left housing unit 56L of the headphone device 5 such that the imaging units 51a to 51d capture images of at least areas outside of the limit range of the field of vision of the user.

Figure 25:
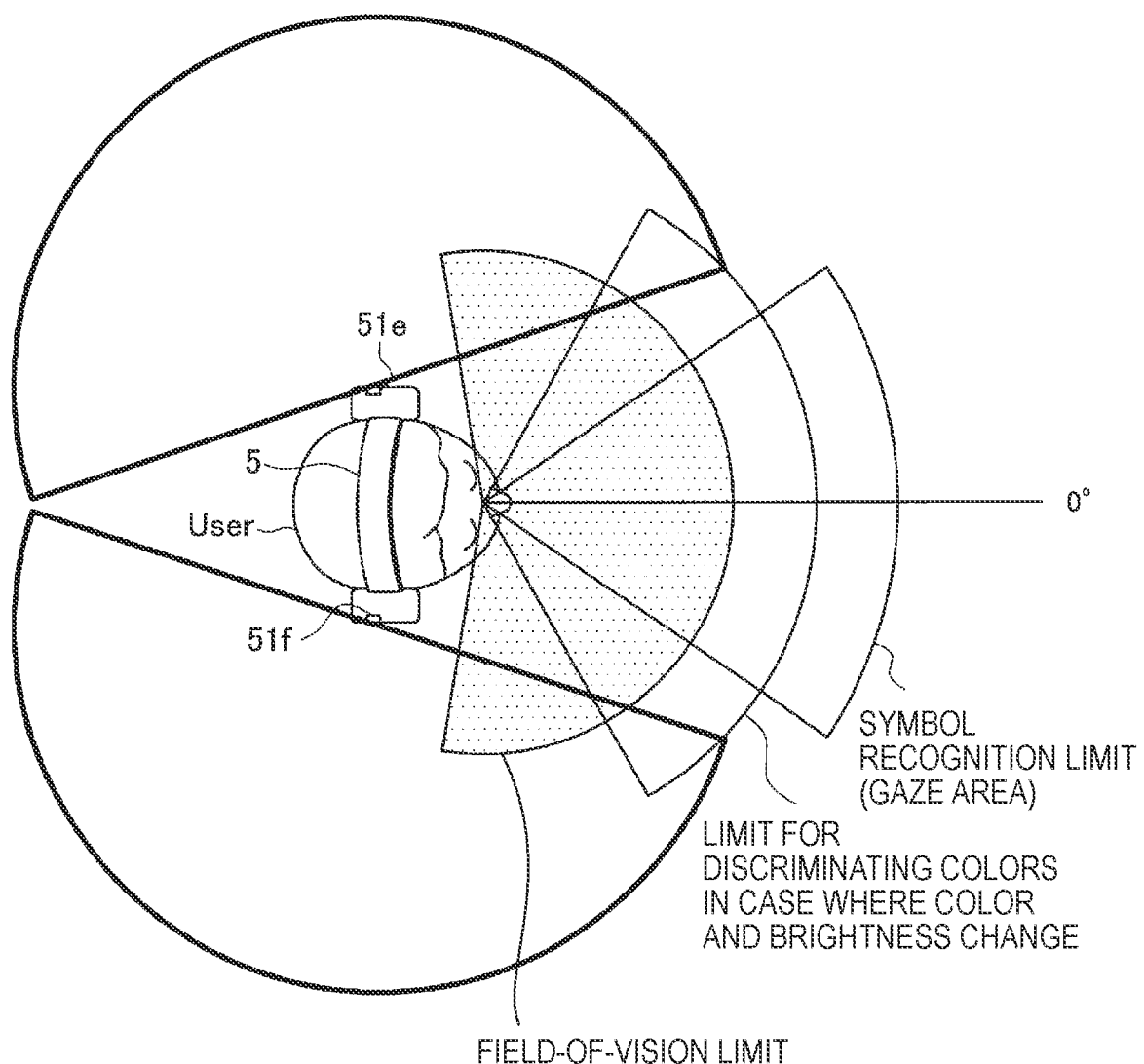
FIG. 25 is a diagram illustrating another installation example of imaging units according to the second embodiment.

FIG. 25 is a diagram illustrating another installation example of imaging units 51 according to the embodiment. For example, as illustrated in FIG. 25, each of imaging units 51e and 51f may have an angle of view of 180°, and the imaging unit 51e may be installed on the left housing unit 56L of the headphone device 5 and the imaging unit 51f may be installed on the right housing unit 56R of the headphone device 5 such that the imaging units 51e and 51f capture images of at least areas outside of the limit range of the field of vision of the user.

Note that, in the examples illustrated in FIG. 24 and FIG. 25, the cameras whose angles of view covers areas outside of the field of vision of the user are used as examples. However, the embodiment is not limited thereto. It is also possible to use an imaging unit that captures the area of the field of vision of the user and the areas outside of the field of vision of the user. For example, a fisheye lens, a hyperboloidal mirror camera, or the like may be installed on a headset such that the fisheye lens, the hyperboloidal mirror camera, or the like takes a video of 360°. The headset is positioned on the head when the headphone device 5 is worn.

The microphone 52 collects voice of the user and outputs a sound signal to the control unit 50.

The communication unit 53 has a function of connecting with an external device in a wired or wireless manner and transmitting/receiving data. For example, the communication unit 53 connects with the network 7 via Wi-Fi (registered trademark), Bluetooth (registered trademark), a wireless local area network (LAN), or the like, and transmits/receives data to/from the server 6 via the network 7.

The speaker 54 has a function of reproducing sound signals. For example, the speaker 54 according to the embodiment includes a pair of ear units. The ear units are installed in the housing units 56R and 56L such that the respective ear units cover the right ear and the left ear of the user when the user is wearing the headphone device 5. In addition, the speaker 54 may be configured as a so-called bone conduction speaker.

Details of the configuration example of the headphone device 5 have been described above.

(2-2-2. Configuration of Server 6)

Next, a configuration of the server 6 will be described. As illustrated in FIG. 23, the server 6 according to the embodiment includes a control unit 60, a communication unit 61, a user profile storage unit 62, a phoneme DB 63, and a face image DB 64.

The control unit 60 functions as an arithmetic processing device and a control device to control overall operation in the server 6 in accordance with various kinds of programs. For example, the control unit 60 is implemented by an electronic circuit such as a CPU or a microprocessor. The control unit 60 may include ROM for storing programs, arithmetic parameters, and the like to be used, and RAM for temporarily storing parameters and the like that change appropriately.

In addition, the control unit 60 according to the embodiment also functions as a sound/text conversion unit 601, a meaning understanding unit 602, a face image recognition unit 603, and a response message generation unit 604.

The sound/text conversion unit 601 analyzes a sound signal transmitted from the headphone device 5 and converts it to text. In addition, the sound/text conversion unit 601 also converts a response message to a sound signal. The response message is generated by the response message generation unit 604 (to be described later). In the case of conversion to a sound signal, the response message is converted to voice of a predetermined agent by using phoneme data accumulated in the phoneme DB 63.

The meaning understanding unit 602 understands meanings of a text by analyzing the text obtained through conversion performed by the sound/text conversion unit 601. For example, the meaning understanding unit 602 understands meanings of a text by performing a morphological analysis and a syntax analysis.

The face image recognition unit 603 analyzes a captured image transmitted from the headphone device 5 and recognizes a face image. In addition, the face image recognition unit 603 refers to registered face images that have been registered in the face image DB 64 and determines whether or not the face image DB 64 includes a face image that has an amount of facial characteristic similar to the captured image transmitted from the headphone device 5.

The response message generation unit 604 generates a response message in response to the user voice on the basis of the meaning analysis result obtained through analysis performed by the meaning understanding unit 602. In addition, in the case where the face image recognition unit 603 has recognized a face image of a registered predetermined person in a captured image, the response message generation unit 604 generates a response message that notifies the user of existence of the person.

The communication unit 61 has a function of connecting with an external device and transmitting/receiving data. For example, the communication unit 61 connects with the network 3 via a wireless or wired local area network (LAN) or the like, and transmits/receives data to/from the headphone device 5.

The user profile storage unit 62 accumulates information related to a user. For example, the information related to the user includes agent setting information, friend information, and the like.

The phoneme DB 63 is a storage unit that stores phoneme data. The phoneme DB 63 includes phoneme data for each agent.

The face image DB 64 is a storage unit that accumulates face image information (image data and characteristic amount data) of predetermined people such as friends of each user.

<2-3. Operation Process>

Figure 26:
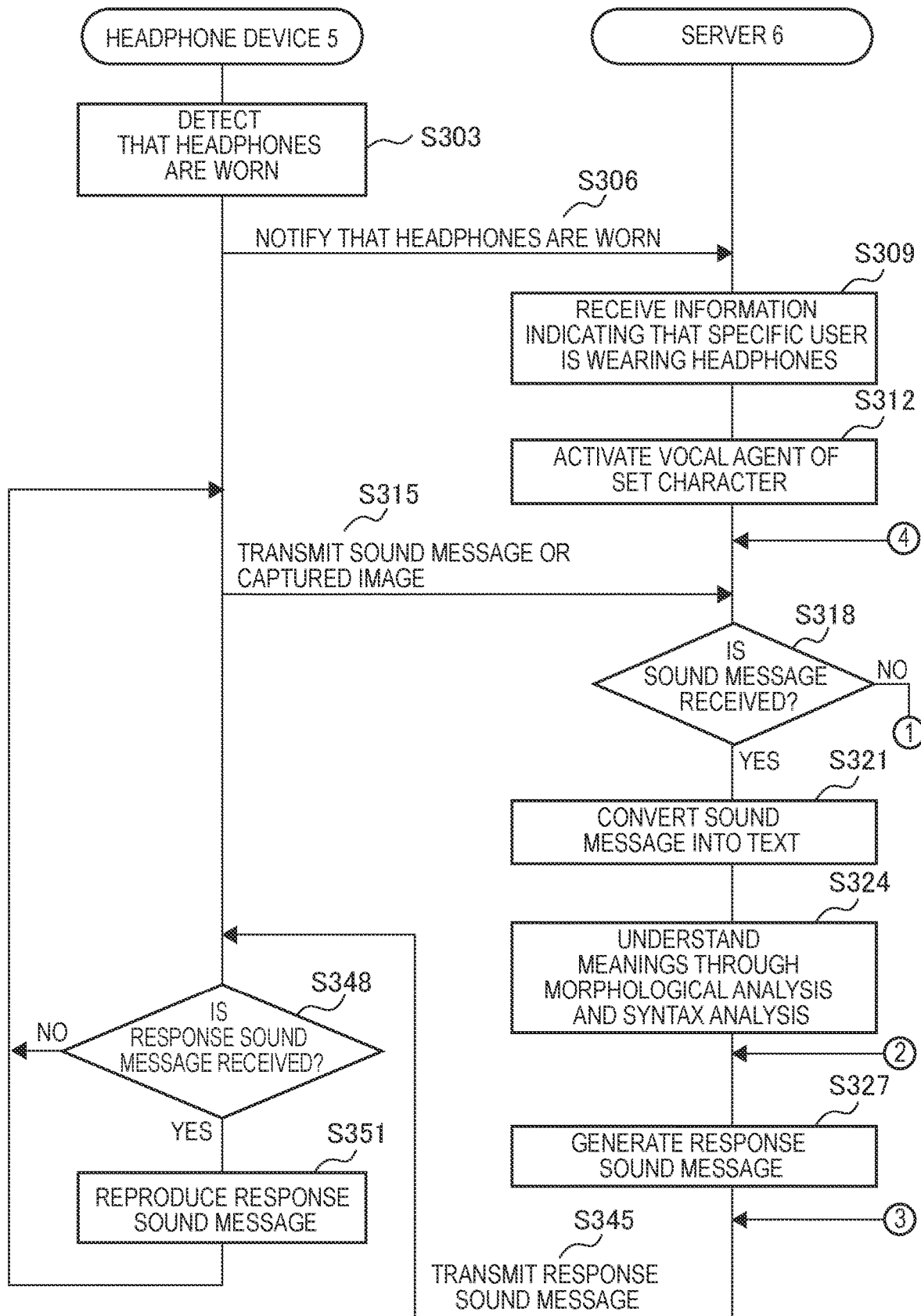
FIG. 26 is a sequence diagram illustrating an operation process in the information processing system according to the second embodiment.
Figure 27:
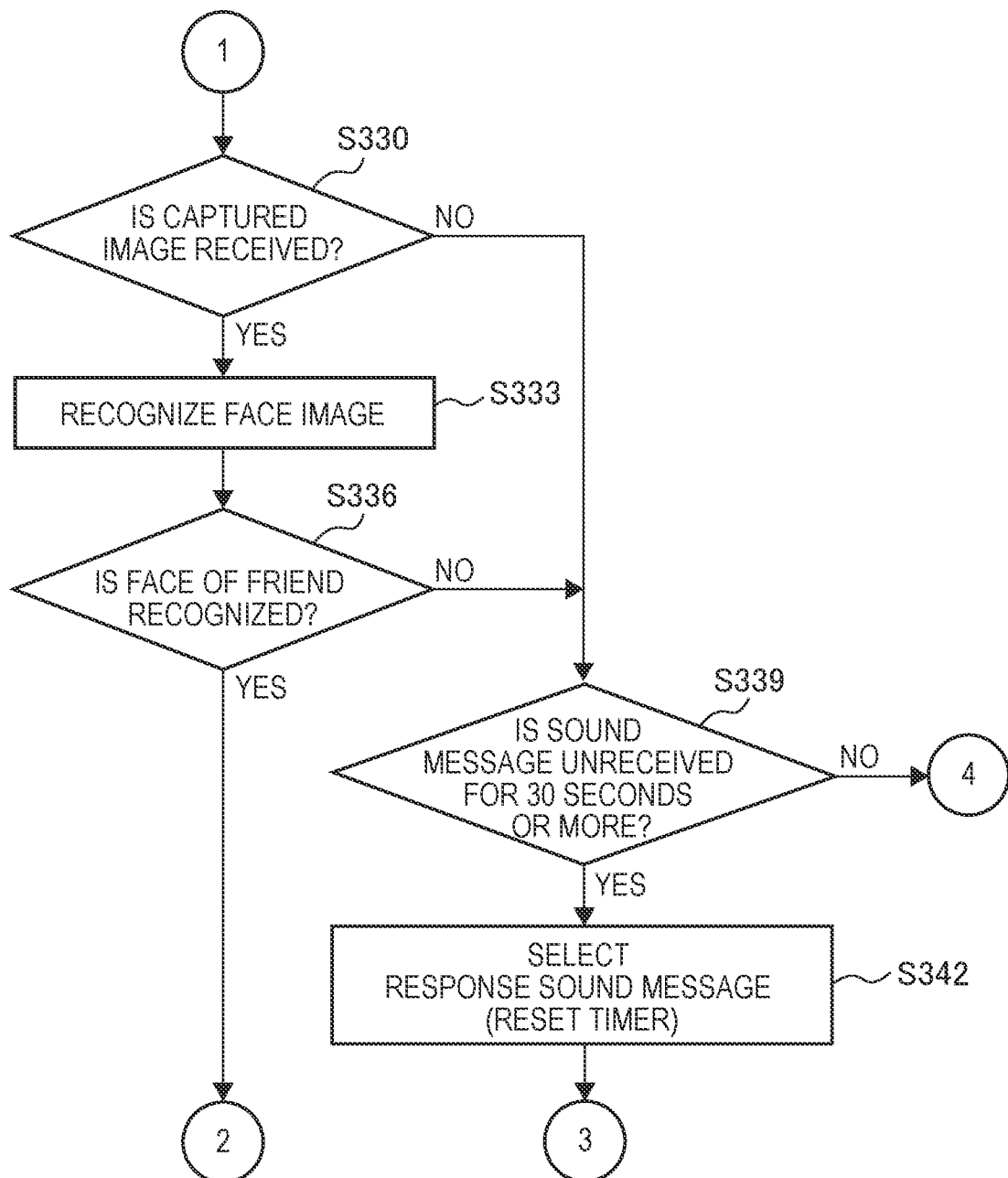
FIG. 27 is a sequence diagram illustrating an operation process in the information processing system according to the second embodiment.

Next, with reference to FIG. 26 to FIG. 27, operation processes according to the embodiment will be described. FIG. 26 and FIG. 27 are sequence diagrams illustrating operation processes in the information processing system according to the embodiment.

As illustrated in FIG. 26, the headphone device 5 first detects that the headphones are worn by a user (Step S303). The headphones may be detected to be worn in the case where the power source of the headphone device 5 is turned on, for example.

Next, the headphone device 5 notifies the server 6 that the headphones are worn (Step S306). At this time, in addition to the notification, user identification information such as a user ID is also transmitted to the server 6.

Next, when information indicating that a specific user is wearing the headphones is received (Step S309), the server 6 refers to user profile and activates a vocal agent of a predetermined character (agent character) set for the specific user (Step S312). Accordingly, vocal conversations with the agent character starts.

Next, the headphone device 5 continuously transmits, to the server 6, a user sound message collected by the microphone 52 (in other words, speech voice data) or images captured by the imaging units 51 (specifically, captured images of at least areas outside of the field of view) (Step S315).

Next, in the case where the sound message is received by the server 6 from the headphone device 5 (YES in Step S318), the sound/text conversion unit 601 converts the sound message into a text (Step S321), and the meaning understanding unit 602 performs the morphological analysis and the syntax analysis to understand meanings of the sound message that has been converted into the text.

Next, the response message generation unit 604 of the server 6 generates a response sound message in accordance with a result of the meaning understanding (Step S327), and the server 6 transmits, to the headphone device 5, the response sound message that has been converted to a sound signal by the sound/text conversion unit 601 (Step S345).

On the other hand, in the case where a captured image is received by the server 6 (YES in Step S330) from the headphone device 5 instead of the sound message (NO in Step S318), the headphone device 5 recognizes a face image by using the face image recognition unit 603 (Step S333).

Next, the face image recognition unit 603 compares the recognized face image with face images of predetermined people such as friends of the user, and performs a recognition process of a face of a predetermined person such as a friend (Step S336). The face images are registered in advance in the face image DB 64.

Next, in the case where the face of the predetermined person such as a friend is recognized (YES in Step S336), the response message generation unit 604 generates a response sound message for notifying the user that the predetermined person is found (Step S327).

On the other hand, in the case where the predetermined person such as a friend is not recognized (NO is Step S336) and a sound message is not received for a predetermined period of time (such as 30 seconds) (NO in Step S339), the response message generation unit 604 of the server 6 resets a timer and selects a response sound message (Step S342). For example, the response message generation unit 604 selects and generates a hail message to a user such as "what are you doing?" or "guess what!".

Next, when the headphone device 5 receives the response sound message from the server 6 (YES in Step S348), the speaker 54 reproduces the response sound message (Step S351).

As described above, according to the embodiment, a face image of a predetermined person such as a friend is registered in advance in the face image DB 64, and the face registered in the face image DB 64 is compared with faces in images captured by the imaging units 51 in the background while the user is talking with the vocal agent. Next, the vocal agent notifies the user in the case where the face of the registered friend is found.

Accordingly, it is possible for the user to always connect with someone/something while the user is wearing the headphone device 5 according to the embodiment, such that the vocal agent serves as someone to talk to, or the vocal agent notifies the user in the case where the vocal agent has found a friend of the user in an area outside of the field of view of the user.

<2-4. Application Example>

Next, details of application examples of the embodiment will be described with reference to drawings.

(2-4-1. First Application Example)

In the above-described embodiment, the user is notified in the case where a friend is found. However, the embodiment is not limited thereto. It is also possible to notify the user of only a friend who is OK to be found. Specifically, in the case where a registered friend is found in a background process, a notification for obtaining permission of being found by the user is transmitted to a communication terminal of the friend via a communication application programming interface (API). The vocal agent notifies the user only in the case where the friend is OK to be found. Accordingly, it is possible to avoid notifying the user of the friend who does not want to be found. Next, details thereof will be described with reference to FIG. 28 to FIG. 29.

(Configuration)

Figure 28:
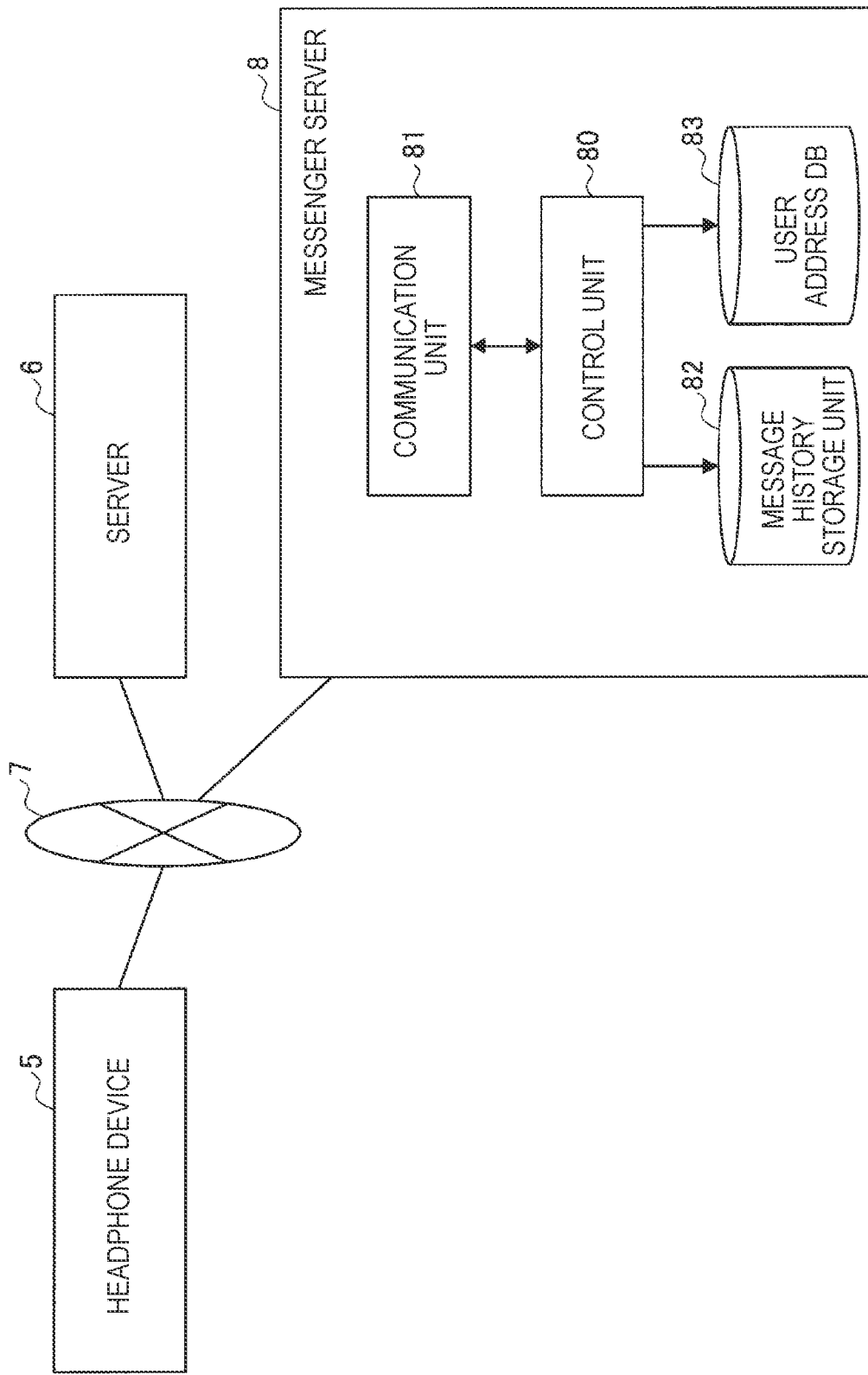
FIG. 28 is a diagram illustrating an overall configuration of an information processing system according to a first application example of the second embodiment.

FIG. 28 is a diagram illustrating an overall configuration of an information processing system according to a first application example. As illustrated in FIG. 28, the information processing system according to the first application example includes the headphone device 5, the server 6, and a messenger server 8.

The configurations of the headphone device 5 and the server 6 are similar to the configurations that have been described with reference to FIG. 23. Accordingly, repeated description and reference to drawings are omitted here.

The messenger server 8 is a server that implements the communication API. The messenger server 8 includes a control unit 80, a communication unit 81, a message history storage unit 82, and a user address DB 83.

The control unit 80 connects with communication terminals of respective users via the communication unit 81, and transmits/receives data. Specifically, the control unit 80 may transmit/receive messages between the users. In addition, in response to a request from the server 6, the control unit 80 performs control such that an inquiry message is transmitted to a communication terminal of a predetermined user, and a response from the user is returned to the server 6.

The message history storage unit 82 stores messages exchanged between the respective users.

The user address DB 83 stores addresses of the respective users.

(Operation Process)

Figure 29:
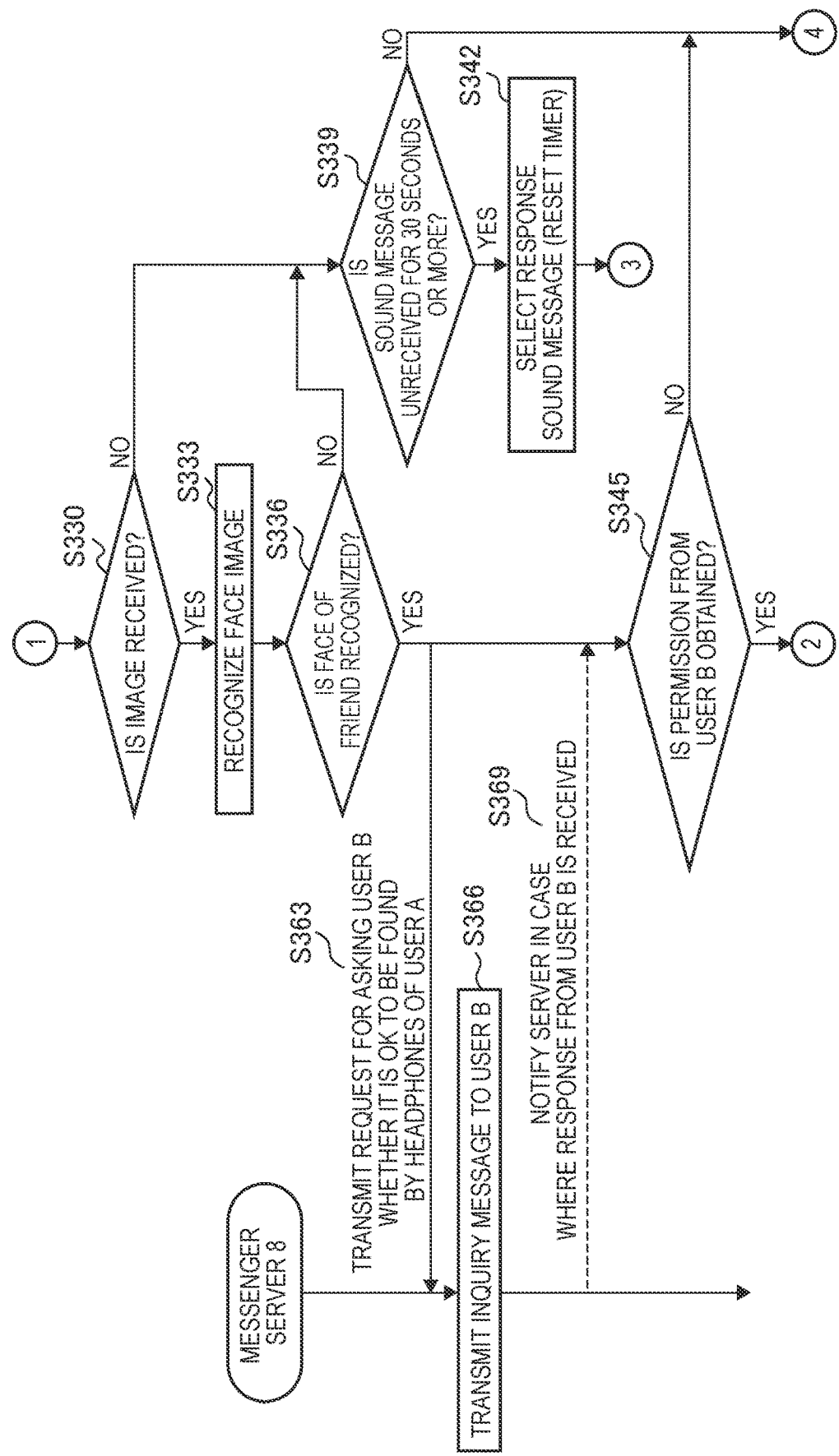
FIG. 29 is a flowchart illustrating an operation process of the information processing system according to the first application example of the second embodiment.

FIG. 29 is a flowchart illustrating an operation process of the information processing system according to the first application example. Here, with reference to drawings, steps that are different from the operation processes described with reference to FIG. 26 and FIG. 27 will be mainly described.

In this application example, the processes in Step S303 to Step S351 illustrated in FIG. 26 and FIG. 27 are carried out to provide a vocal conversation with the agent.

In addition, in the application example, in the case where the face image recognition unit 603 of the server 6 recognizes a face of a friend (here, the friend is assumed to be a "user B") (YES in Step S336), a request is transmitted to the messenger server 8 for asking the user B whether it is OK to be found by the headphone device 5 of a user (here, the user is assumed to be a "user A") (Step S363).

Next, the messenger server 8 transmits an inquiry message to a communication terminal of the user B (such as a smartphone, a mobile phone terminal, a tablet terminal, or a wearable device) (Step S366). Specifically, the messenger server 8 asks whether or not it is OK to be found by the headphone device 5 of the user A. The user B answers yes or no when the communication terminal of the user B outputs the inquiry by voice or display.

Next, when a response from the user B is received, the messenger server 8 notifies the server 6 of the response (Step S369).

Next, in the case where permission from the user B is obtained (YES in Step S342), the response message generation unit 604 of the server 6 generates a response sound message for notifying the user A that the user B is found (Step S327).

On the other hand, in the case where the permission from the user B is not obtained (NO in Step S342), the server 6 does not generate the response sound message for notifying the user A that the user B is found.

As described above, in the first application example, it is possible to prevent notifying the user when the headphone device 5 of the user A has found a user but permission from the found user is not obtained.

(2-4-2. Second Application Example)

Next, an information processing system according to the embodiment is capable of notifying of a direction in which a friend is located, when notifying that the friend is found. Specifically, in the case where a registered friend is found in the background process, it is possible to notify a user of a direction in which the friend is located, on the basis of a relative relation between a position of the friend and a position of the user. Next, details thereof will be described with reference to FIG. 30 to FIG. 32.

(Configuration)

Figure 30:
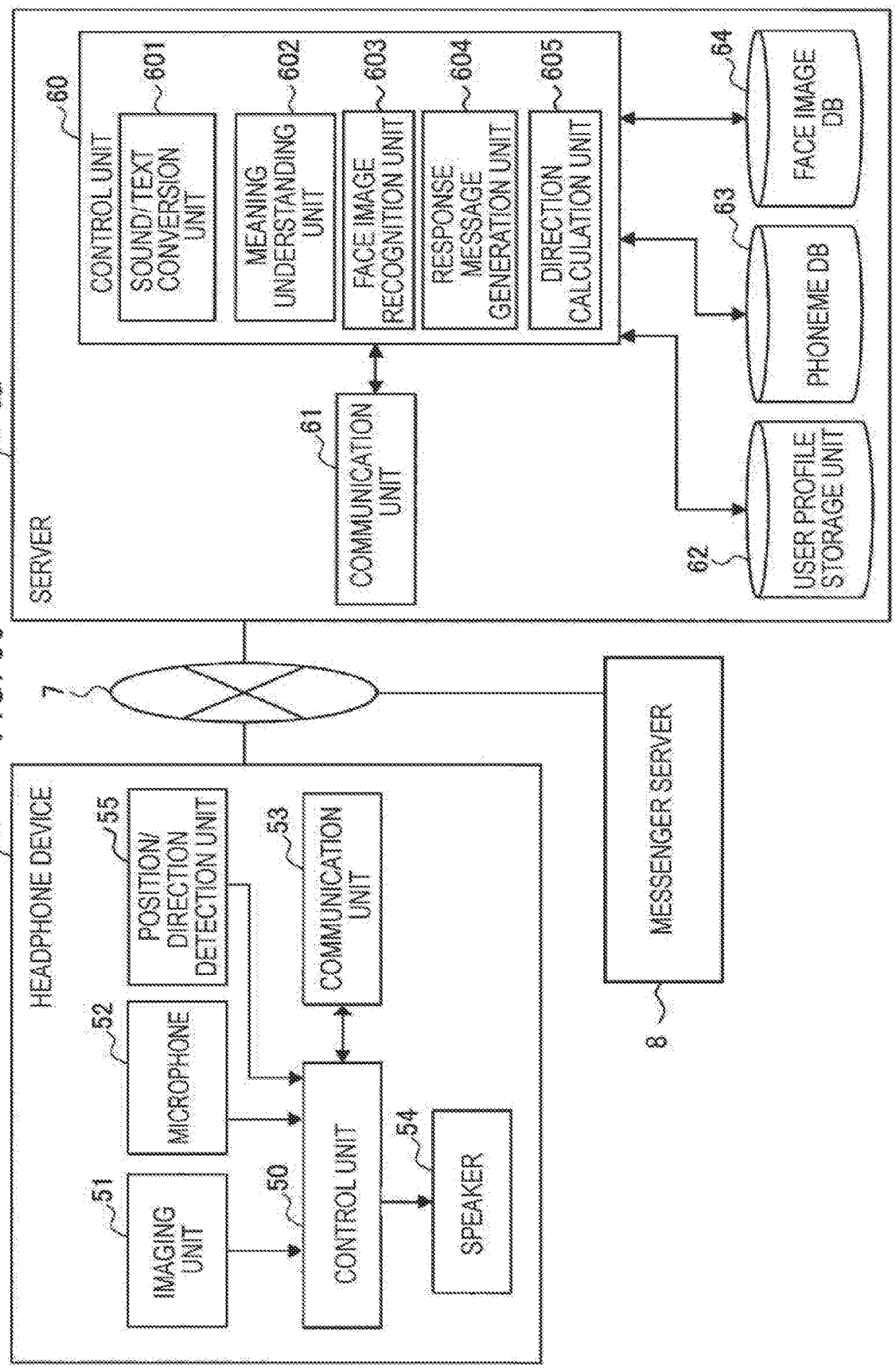
FIG. 30 is a diagram illustrating an overall configuration of an information processing system according to a second application example of the second embodiment.

FIG. 30 is a diagram illustrating an overall configuration of an information processing system according to a second application example. As illustrated in FIG. 30, the information processing system according to the second application example includes a headphone device 5*a*, a server 6*a*, and the messenger server 8. Here, a case where the information processing system includes the messenger server 8 described in the first application example and therefore has a function of notifying a user when permission from a found friend is obtained, will be described, as an example.

In addition, the headphone device 5*a* has a position/direction detection unit in addition to the structural elements described with reference to FIG. 23. The position/direction detection unit 55 has a function of detecting positional information of the headphone device 5 and a function of detecting a direction of the headphone device 5. For example, the function of detecting positional information is implemented by a Global Positioning System (GPS) unit that receives radio waves from a GPS satellite, detects a position of the headphone device 5, and outputs the detected positional information to the control unit 50. In addition to the GPS, the function of detecting positional information may be implemented by something that detects a position through Wi-Fi (registered trademark), Bluetooth (registered trademark), transmission/reception to/from a mobile phone, a PHS, a smartphone, or the like, near-field communication, or the like, for example. In addition, the function of detecting a direction may be implemented by a gyro sensor or a geomagnetic sensor, and may detect a direction in which the user wearing the headphone device 5*a* faces.

In addition to the structural elements described with reference to FIG. 23, the server 6*a* includes a direction calculation unit 605 as a function of the control unit 60.

The direction calculation unit 605 calculates a direction in which the user B is located, on the basis of a current position of the user and a position of the friend recognized by the face image recognition unit 603. The direction in which the user B is located may be expressed on the basis of the direction to which the user A faces, such as "your friend is on the back right side" or "your friend is on the back left side". Alternatively, the direction in which the user B is located may be expressed by using a point serving as a landmark around the users, such as "your friend is in the XX building direction" or "your friend is in the XX station direction".

(Operation Process)

Figure 31:
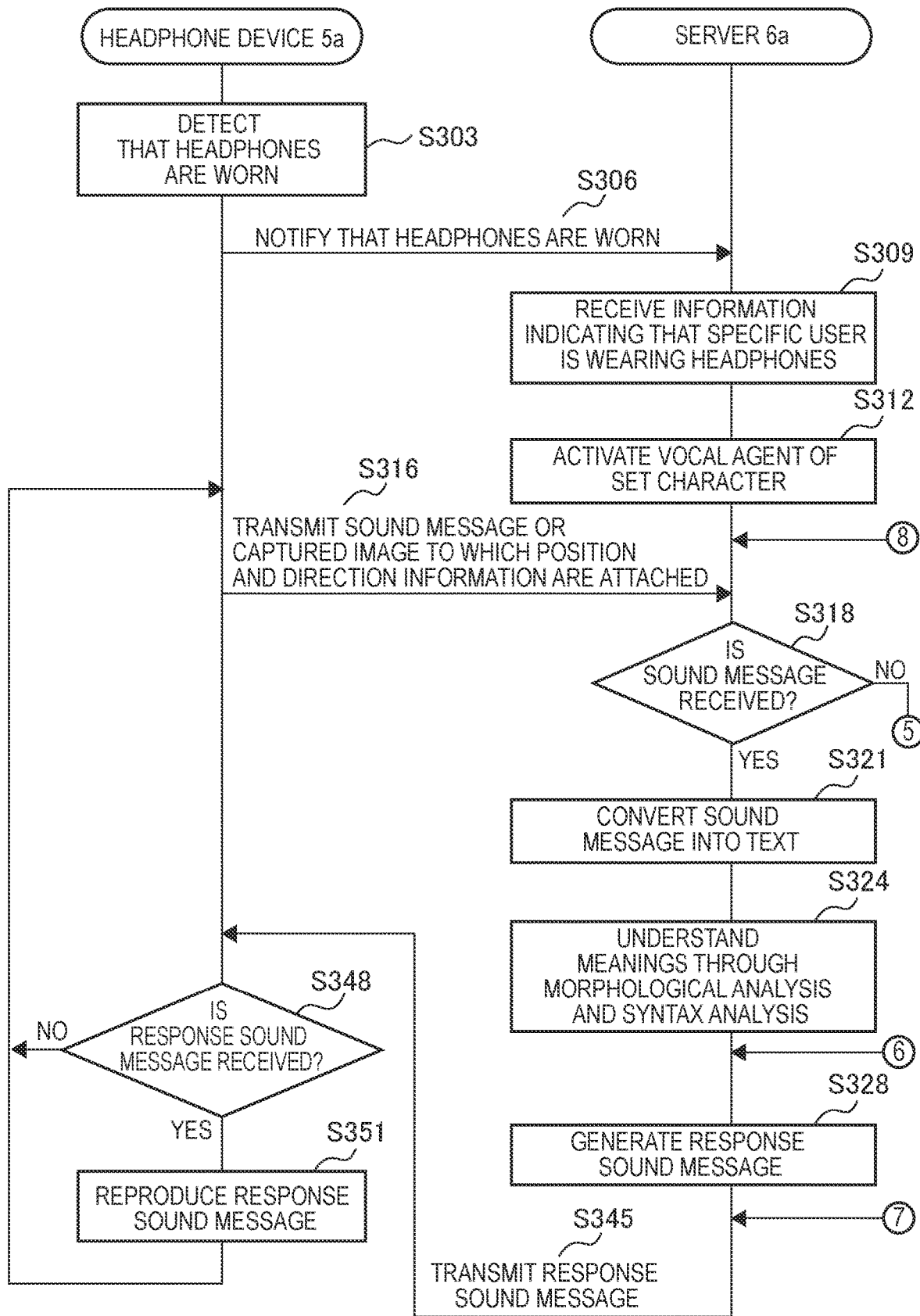
FIG. 31 is a flowchart illustrating an operation process of the information processing system according to the second application example of the second embodiment.
Figure 32:
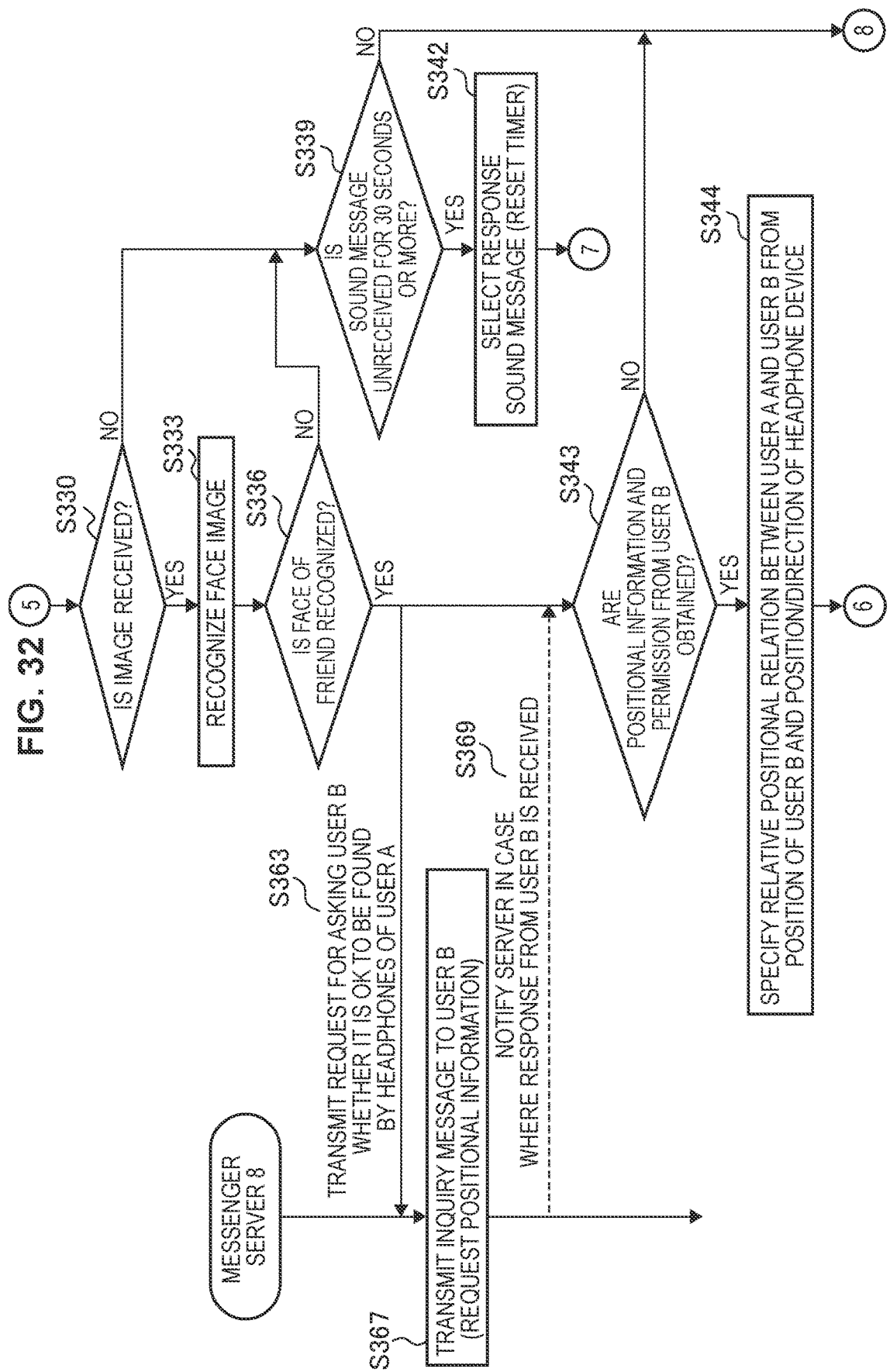
FIG. 32 is a flowchart illustrating an operation process of the information processing system according to the second application example of the second embodiment.

FIG. 31 and FIG. 32 are flowcharts illustrating operation processes of the information processing system according to the second application example. Note that, processes similar to the operation processes described with reference to FIG. 26 and FIG. 27 are denoted with the same step numbers.

As illustrated in FIG. 31, the headphone device 5*a* first detects that the headphones are worn (Step S303), and then notifies the server 6*a* (Step S306).

Next, when information indicating that a specific user is wearing the headphones is received (Step S309), the server 6*a* activates a vocal agent of a set predetermined character (agent character) (Step S312).

Next, the headphone device 5*a* continuously transmits, to the server 6*a*, a sound message or a captured image to which positional information and direction information detected by the position/direction detection unit 55 are attached (Step S316).

Next, in the case where the sound message is received from the headphone device 5*a* (YES in Step S318), the sound/text conversion unit 601 of the server 6*a* converts the sound message into a text (Step S321), and the meaning understanding unit 602 performs a morphological analysis and a syntax analysis to understand meanings of the sound message that has been converted into the text.

Next, the response message generation unit 604 of the server 6*a* generates a response sound message in accordance with a result of the meaning understanding (Step S328), and the server 6*a* transmits, to the headphone device 5*a*, the response sound message that has been converted to a sound signal by the sound/text conversion unit 601 (Step S345).

On the other hand, in the case where a captured image is received by the server 6*a* from the headphone device 5*a* (YES in Step S330) instead of the sound message (NO in Step S318), the headphone device 5*a* recognizes a face image by using the face image recognition unit 603 (Step S333).

Next, in the case where the face image recognition unit 603 compares the recognized face image with face images of predetermined people such as friends of the user that are registered in advance on the face image DB 64, and recognizes a face of a friend (here, the friend is assumed to be the "user B") (YES in Step S336), a request is transmitted to the messenger server 8 for asking the user B whether it is OK to be found by the headphone device 5*a* of a user (here, the user is assumed to be the "user A") (Step S363).

Next, the messenger server 8 transmits an inquiry message to a communication terminal of the user B (Step S367). At this time, the messenger server 8 also requests current positional information of the user B.

Next, when a response from the user B is received, the messenger server 8 notifies the server 6*a* of the response (Step S369). At this time, the current positional information obtained from the communication terminal of the user B may be attached to the response.

Next, in the case where the positional information and the permission from the user B are obtained (YES in Step S343), the direction calculation unit 605 of the server 6*a* specifies a relative positional relation between the user A and the user B from a position of the user and a position/direction of the headphone device 5*a* (Step S344). Note that, as described above, the information indicating the direction of the user B may be information using a building or the like that may serve as a landmark around the user A.

Next, the response message generation unit 604 of the server 6*a* generates a response sound message for notifying the user A that the user B is found and notifying the user A of the direction in which the user B is located (Step S328).

As described above, in the second application example, it is possible to additionally notify the user A of a direction in which a friend is located in the case where the friend is found.

(2-4-3. Third Application Example)

In the above-described embodiments and application examples, the server 6 performs the process for recognizing a registered face image from a captured image. However, the embodiment is not limited thereto. It is also possible for the headphone device 5 to perform the process for finding friends. Next, the following description will be given with reference to FIG. 33 to FIG. 34.

(Configuration)

FIG. 33 is a diagram illustrating an overall configuration of an information processing system according to a third application example. As illustrated in FIG. 33, the information processing system according to the third application example includes a headphone device 5*b* and the server 6*b*.

In addition to the structural elements described with reference to FIG. 23, the headphone device 5*b* includes a user profile storage unit 56, a phoneme DB 57, and a face image DB 58. In addition, a control unit 50*b* of the headphone device 5*b* functions as a face image recognition unit 501 and a response message generation unit 502.

In ways similar to the user profile storage unit 62, the phoneme DB 63, and the face image DB 64 of the server 6 described with reference to FIG. 23, the user profile storage unit 56, the phoneme DB 57, and the face image DB 58 respectively accumulates information related to users, phoneme data, and face image information of predetermined people such as friends of the users.

The face image recognition unit 501 recognizes a face image by analyzing an image of at least an area outside of a field of view, the image having been captured by the imaging units 51. In addition, the face image recognition unit 501 refers to registered face images (face images of friends) that have been registered in the face image DB 58 and determines whether or not captured images include a face image that has an amount of facial characteristic similar to the registered face image.

In the case where the face image recognition unit 501 recognizes a face image of a registered predetermined person in a captured image, the response message generation unit 502 generates a response message that notifies the user of existence of the person.

(Operation Process)

Figure 34:
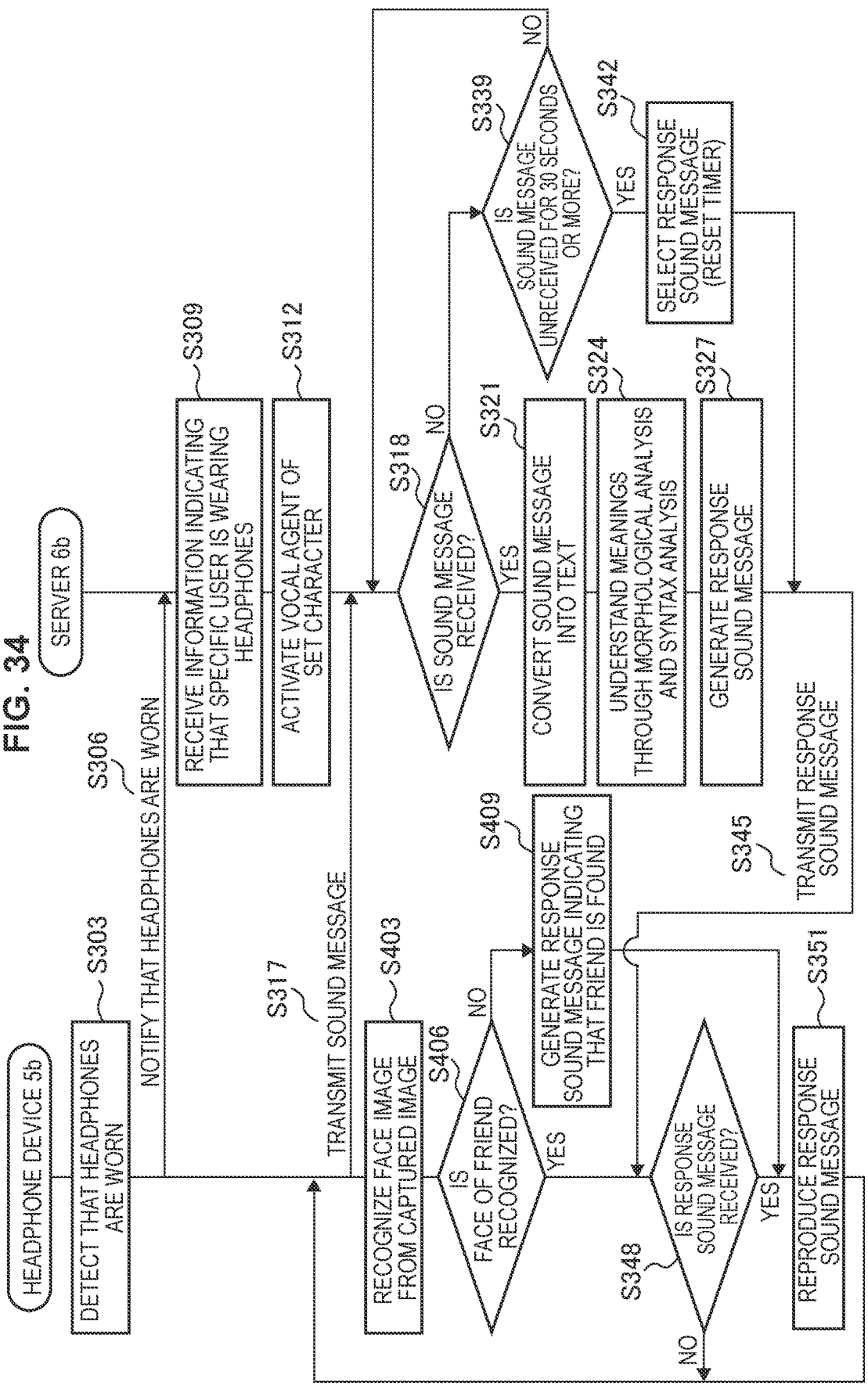
FIG. 34 is a flowchart illustrating an operation process of the information processing system according to the third application example of the second embodiment.

FIG. 34 is a flowchart illustrating an operation process of the information processing system according to the third application example. Note that, processes similar to the operation processes described with reference to FIG. 26 and FIG. 27 are denoted with the same step numbers.

As illustrated in FIG. 34, the headphone device 5*b* first detects that the headphones are worn (Step S303), and then notifies the server 6*b* (Step S306).

Next, when information indicating that a specific user is wearing the headphones is received (Step S309), the server 6*b* activates a vocal agent of a set predetermined character (agent character) (Step S312).

Next, the headphone device 5*b* continuously transmits a sound message to the server 6*a* (Step S317), the server 6*b* understands meanings of the sound message (Step S318 to Step S324), and a response sound message is generated (Step S327).

In addition, in the case where the sound message is not received for a predetermined period of time (such as 30 seconds) or more (YES in Step S339), a response sound message is automatically selected (Step S342).

Next, when the response sound message is received from the server 6*b* (YES in Step S348), the speaker 54 of the headphone device 5*b* reproduces the response sound message of the agent (Step S351).

In addition, the face image recognition unit 501 of the headphone device 5*b* according to the embodiment recognizes a face image from a captured image (Step S403). At this time, the face image recognition unit 501 also matches the recognized face with faces of friends registered in advance in the face image DB 58.

Next, in the case where the face of the friend is recognized from the captured image (YES in Step S406), the response message generation unit 502 of the headphone device 5*b* generates a response sound message indicating that the friend is found (Step S409). In addition, the response message generation unit 502 converts the generated response message into a sound signal by using phoneme data of a predetermined agent stored in the phoneme DB 57.

Next, the speaker 54 of the headphone device 5*b* reproduces the generated response sound message of the agent (Step S351).

As described above, in the third application example, it is possible for the headphone device 5 alone to find a friend and notify a user.

<2-5. Supplement>

Supplements to the above-described second embodiment will be described. In the embodiment, a plurality of the vocal agents may be set. It is also possible for a user to select an agent by calling the name of the agent and carry out conversations. Specifically, as described in JP 2002-358092A, such a function is achieved by accumulating a plurality of sets of phonemes in phoneme DBs for the plurality of vocal agents. Since names and the phoneme DBs are associated with each other, the server 6 is capable of automatically switching phonemes when detecting a name of an agent specified by a user through a speech recognition process. In addition, the user is also capable of selecting a vocal agent on the basis of voice qualities of the vocal agents. In addition, according to the second application example described above, in the case where phoneme data of a friend is registered in the phoneme DB, it is also possible to combine the second application example with a sound image localization technology and reproduce a response sound message such that the agent calls to the user by using voice of the friend from a direction in which the friend is located.

In addition, in the case where a friend is found, it is also possible to notify the friend of positional information of a user himself/herself through the messenger server 8 or the like, and start navigation using a communication terminal of the friend.

In addition, it is possible to turn off the function of finding friends according to the embodiment in case where the user is busy or in a hurry, for example.

In addition, in the above-described first application example, it is necessary for a found user to perform a permission process. However, to reduce the burden of permission, it is also possible to preliminarily set whether or not it is OK to be found by friends by using a vocal agent of a smartphone or a headphone device.

In addition, it is also possible for the headphone device 5 to include an imaging unit that captures images of a field-of-view (front) direction of the user.

In addition, in the third application example described above, the case where the headphone device 5 performs the process of finding friends has been described. However, it is also possible for the headphone device 5 to perform a vocal agent conversation generation process.

In addition, in the second embodiment and the respective application examples described above, the system configuration in which the headphone device 5 directly communicates with the server 6 on the network via the communication unit 53 has been described. However, the embodiment is not limited thereto. It is also possible that the headphone device 5 communicates with the server 6 via an external communication terminal such as a smartphone held by the user.

3. Conclusion

As described above, according to the embodiments of the present disclosure, it is possible for the information processing system to present information that a user does not notice.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, ROM, and RAM, which are embedded in the above described glasses-type terminal 1, server 2, headphone device 5, or server 6, to execute the functions of the glasses-type terminal 1, server 2, headphone device 5, or server 6. Moreover, it may be possible to provide a computer-readable recording medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification. Additionally, the present technology may also be configured as below.

(1)
A server including:
a communication unit configured to receive information related to an image acquired by an imaging unit of a client terminal; and
a control unit configured to be capable of extracting information corresponding to an object on the basis of the information related to the image, and transmit information related to the object to the client terminal, the object being positioned outside of a gaze area of a user and being related to user information.

(2)
The server according to (1),
in which the control unit performs control such that information corresponding to an object depending on interest information of the user is extracted from a field-of-view image of the user acquired by the imaging unit of the client terminal, and character information and presentation information to be presented to the user are transmitted to the client terminal via the communication unit, the character information indicating a character that is superimposed and displayed on the information corresponding to the object.

(3)
The server according to (2),
in which the control unit decides the presentation information to be presented to the user on the basis of comparison between the information related to the object and the interest information of the user.

(4)
The server according to any one of (1) to (3),
in which the control unit changes a content of presentation information to be presented to the user in accordance with information related to a gaze of the user when receiving, via the communication unit, the information related to the gaze of the user on a character that is superimposed and displayed on the information corresponding to the object.

(5)
The server according to (4),
in which the information related to the gaze of the user is a presentation information update request.

(6)
The server according to (5),
in which the control unit changes the content of the presentation information to more detailed information in accordance with the presentation information update request.

(7)
The server according to (4),
in which the information related to the gaze of the user on the character that is superimposed and displayed is information regarding a fact that the user has paid attention to the character.

(8)
The server according to (1), in which
the control unit has a function of understanding a meaning of sound input by a user of the client terminal and transmitting a corresponding sound message to the client terminal, and
the control unit controls the communication unit such that, when a pre-registered person is detected from an image captured by the imaging unit of the client terminal, a sound message for notifying the user of the detection is transmitted to the client terminal.

(9)
The server according to (8),
in which the control unit controls the communication unit such that, when a pre-registered person is detected from at least an image of an area outside of a field of view of the user, a sound message for notifying the user of the detection is transmitted to the client terminal, the image having been captured by the imaging unit of the client terminal.

(10)
The server according to (8) or (9),
in which the control unit controls the communication unit such that a request demanding permission for notification to the user is transmitted to an account of the pre-registered person, and
a sound message for notifying the user is transmitted to the client terminal in accordance with a response received in accordance with the request.

(11)
The server according to any one of (8) to (10),
in which the control unit controls the communication unit such that
information regarding a position and a direction of the client terminal is acquired together with the image captured by the imaging unit of the client terminal,
a request demanding permission for notification to the user and for current positional information is transmitted to an account of the pre-registered person, and
a sound message for notifying the user of information indicating a direction in which the pre-registered person is located is transmitted to the client terminal in accordance with the positional information and permission issued in response to the demand for permission for notification to the user, which have been received in accordance with the request.

(12) A client terminal including:
an output unit configured to output information to a user; and
a control unit configured to control the output unit such that information related to an object is output in accordance with information corresponding to the object, the object being specified on the basis of information related to an image acquired by an imaging unit, being positioned outside of a gaze area of the user, and being related to user information.

(13) The client terminal according to (12),
in which the control unit controls the output unit such that character information is superimposed and displayed on the object related to interest information of the user in the image and presentation information to be presented to the user is output.

(14) The client terminal according to (12), in which the control unit controls the output unit such that, when a pre-registered person is detected from an image captured by the imaging unit, the output unit outputs a sound message for notifying the user that the person is detected.

(15) A control method that causes a processor to:
receive, by a communication unit, information related to an image acquired by an imaging unit of a client terminal; and
be capable of extracting information corresponding to an object on the basis of the information related to the image, and transmit information related to the object to the client terminal, the object being positioned outside of a gaze area of a user and being related to user information.

(16) A storage medium having a program stored therein, the program causing a computer to function as:
an output unit configured to output information to a user; and
a control unit configured to control the output unit such that information related to an object is output in accordance with information corresponding to the object, the object being specified on the basis of information related to an image acquired by an imaging unit, being positioned outside of a gaze area of the user, and being related to user information.

REFERENCE SIGNS LIST 1 glasses-type terminal
2 server
3 network
5 headphone device
6 server
7 network
8 messenger server
10 control unit
101 tag image detection unit
102 presentation information acquisition unit
103 presentation method setting unit
104 information presentation control unit
105 user behavior detection unit
106 presentation information updating unit
11 communication unit
12 imaging unit
13 display unit
14 sound output unit
15 storage unit
16 gaze detection unit
20 control unit
201 object information acquisition unit
202 degree-of-attention setting unit
203 presentation information provision unit
204 presentation information updating unit
21 communication unit
22 user information DB
23 object information DB
32 tag image
34 character image
50 control unit
51 imaging unit
52 microphone
53 communication unit
54 speaker
55 potition/detection unit
56 user profile storage unit
60 control unit
601 sound/text conversion unit
602 meaning understanding unit
602 meaning understanding unit
603 face image recognition unit
604 response message generation unit
605 direction calculation unit
61 communication unit
62 user profile storage unit
63 phoneme DB
64 face image DB
80 control unit
81 communication unit
82 message history storage unit

What is claimed is:

1. A server, comprising:
processing circuitry configured to:
receive a notification, from a client terminal, associated with a user of the client terminal;
set a voice associated with the user;
receive an image that is associated with an imaging unit of the client terminal;
detect a person from the received image, wherein the person is a pre-registered person; and
transmit a sound message to the client terminal based on the set voice, wherein the sound message is transmitted to notify the user of the detection of the pre-registered person.

2. The server according to claim 1, wherein the processing circuitry is further configured to:
store information that is associated with information of a plurality of pre-registered persons, wherein the plurality of pre-registered persons comprises the pre-registered person;
compare information of the detected person with the information of the plurality of pre-registered persons; and
identify the person as the pre-registered person of the plurality of pre-registered persons based on the comparison.

3. The server according to claim 1, wherein the processing circuitry is further configured to receive the image of an area of an outside of a field of view of the user.

4. The server according to claim 1, wherein the processing circuitry is further configured to:
receive a tag image associated with a product; and
acquire information related to the product from the tag image; and
transmit the sound message to the client terminal, wherein the sound message is transmitted to notify the user of the information related to the product.

5. The server according to claim 1, wherein the processing circuitry is further configured to:
transmit a request for permission of the notification to the user, wherein the request is transmitted to an account of the pre-registered person;
receive a response from the account of the pre-registered person based on the transmitted request; and
transmit the sound message to the client terminal based on the received response.

6. The server according to claim 1, wherein the processing circuitry is further configured to:
receive information corresponding to a position and a direction of the client terminal;
transmit a request to an account of the pre-registered person, wherein the request includes a demand for current positional information of the pre-registered person and a permission for the notification to the user;
receive a response from the account of the pre-registered person based on the transmitted request, wherein the response indicates each of the permission and the current positional information; and
transmit the sound message based on the received response, wherein the sound message notifies a direction of a location of the pre-registered person to the user.

7. A client terminal, comprising:
an imaging unit configured to acquire an image; and
processing circuitry configured to:
transmit a notification associated with a user of the client terminal to a server;
transmit the image to the server;
receive information from the server based on the transmitted image, wherein the information indicates detection of a pre-registered person in the image; and
output a sound message by a voice based on the received information, wherein
the voice is set by the server based on the notification associated with the user, and
the sound message is output to notify the user of the detection of the pre-registered person.

8. The client terminal according to claim 7, wherein the image corresponds to an image of an area of an outside of a field of view of the user.

9. The client terminal according to claim 7, wherein
the imaging unit is further configured to acquire a tag image associated with a product, and
the processing circuitry is further configured to:
transmit the tag image to the server;
receive information related to the product from the server; and
output the sound message based on the information related to the product, wherein the sound message is output to notify the user of the information related to the product.

10. The client terminal according to claim 9, wherein
the tag image corresponds to a QR code on an object, and
the object is associated with interest information of the user.

11. A control method, comprising:
in a server:
receiving a notification, from a client terminal, associated with a user of the client terminal;
setting a voice associated with the user;
receiving an image that is associated with an imaging unit of the client terminal;
detecting a person from the received image, wherein the person is a pre-registered person; and
transmitting a sound message to the client terminal based on the set voice, wherein the sound message is transmitted to notify the user of the detection of the pre-registered person.

12. The control method according to claim 11, further comprising:
storing information that is associated with information of a plurality of pre-registered persons, wherein the plurality of pre-registered persons comprises the pre-registered person;
comparing information of the detected person with the information of the plurality of pre-registered persons; and
identifying the person as the pre-registered person of the plurality of pre-registered persons based on the comparison.

13. The control method according to claim 11, further comprising receiving the image of an area of an outside of a field of view of the user.

14. The control method according to claim 11, further comprising:
receiving a tag image associated with a product; and
acquiring information related to the product from the tag image; and
transmitting the sound message to the client terminal, wherein the sound message is transmitted to notify the user of the information related to the product.

15. The control method according to claim 11, further comprising:
transmitting a request for permission of the notification to the user, wherein the request is transmitted to an account of the pre-registered person;
receiving a response from the account of the pre-registered person based on the transmitted request; and
transmitting the sound message to the client terminal based on the received response.

16. The control method according to claim 11, further comprising:
receiving information corresponding to a position and a direction of the client terminal;
transmitting a request to an account of the pre-registered person, wherein the request includes a demand for current positional information of the pre-registered person and a permission for the notification to the user;
receiving a response from the account of the pre-registered person based on the transmitted request, wherein the response indicates each of the permission and the current positional information; and
transmitting the sound message based on the received response, wherein the sound message notifies a direction of a location of the pre-registered person to the user.

17. A control method, comprising:
   in a client terminal:
      transmitting a notification associated with a user of the client terminal to a server;
      acquiring an image;
      transmitting the image to the server;
      receiving information from the server based on the transmitted image, wherein the information indicates detection of a pre-registered person in the image; and
      outputting a sound message by a voice based on the received information, wherein
         the voice is set by the server based on the notification associated with the user, and
         the sound message is output to notify the user of the detection of the pre-registered person.

18. The control method according to claim 17, wherein the image corresponds to an image of an area of an outside of a field of view of the user.

19. The control method according to claim 17, further comprising:
   acquiring a tag image associated with a product;
   transmitting the tag image to the server;
   receiving information related to the product from the server; and
   outputting the sound message based on the information related to the product, wherein the sound message is output to notify the user of the information related to the product.

20. The control method according to claim 19, wherein the tag image corresponds to a QR code on an object, and the object is associated with interest information of the user.

* * * * *